US010377442B2

(12) United States Patent
Neilson

(10) Patent No.: US 10,377,442 B2
(45) Date of Patent: Aug. 13, 2019

(54) SUSPENSION FOR A BICYCLE

(71) Applicant: Brent Neilson, Diamond Harbour (NZ)

(72) Inventor: Brent Neilson, Diamond Harbour (NZ)

( * ) Notice: Subject to any disclaimer, the term of this patent is extended or adjusted under 35 U.S.C. 154(b) by 260 days.

(21) Appl. No.: 15/361,624

(22) Filed: Nov. 28, 2016

(65) Prior Publication Data

US 2018/0148123 A1 May 31, 2018

(51) Int. Cl.
*B62M 6/50* (2010.01)
*B62M 9/14* (2006.01)
*B62K 25/28* (2006.01)
*B62K 25/30* (2006.01)

(52) U.S. Cl.
CPC ............ *B62K 25/286* (2013.01); *B62K 25/30* (2013.01)

(58) Field of Classification Search
CPC ......... B62K 25/286; B62K 25/30; B62M 1/30
See application file for complete search history.

(56) References Cited

U.S. PATENT DOCUMENTS 5,295,702 A * 3/1994 Buell .................. B62K 25/005 180/227
5,791,674 A * 8/1998 D'Aluisio ............ B62K 25/286 180/227
7,210,695 B2 * 5/2007 Griffiths ................. B62K 25/16 280/275
7,635,141 B2 * 12/2009 O'Connor ............ B62K 25/286 280/284
7,938,424 B2 * 5/2011 Arraiz .................. B62K 25/286 280/284
8,075,009 B2 * 12/2011 Cocalis .................. B62K 25/28 280/284
2016/0257373 A1 * 9/2016 Emura ..................... B62M 6/50
2018/0037295 A1 * 2/2018 Beale ..................... B62K 25/26

* cited by examiner

*Primary Examiner* — Tony H Winner
(74) *Attorney, Agent, or Firm* — Weiss & Moy, P.C.; Jeffrey D. Moy

(57) ABSTRACT

Disclosed is a suspension for a bicycle. The suspension has a swingarm having a front and rear end and wherein the rear end is configured to attach to a rear wheel of a bicycle, an upper and lower link both adapted to pivotally connect the swing arm to the frame of a bicycle, and a jackshaft having a drive side and a non drive side sprocket and being connected to the front end of the swingarm, the suspension configured such that when in use with a bicycle, a chain connects a drive side front crankset to the drive side jack-shaft sprocket and a second chain connects the non drive side jackshaft sprocket to a rear wheel sprocket and wherein the arrangement allows the rear wheel of the bicycle to move rearward and upward in use.

6 Claims, 39 Drawing Sheets

SUSPENSION FOR A BICYCLE

FIELD OF INVENTION

The invention generally relates to suspension for a bicycle. More particularly it relates to a rear suspension for a bicycle.

BACKGROUND

Some bicycles have rear suspension systems to improve rider comfort and control as the bicycle travels over uneven riding surfaces. Bicycles equipped with suspension systems result in increased rider comfort, enhanced wheel contact and control, and less net rolling resistance. The primary design consideration for suspension systems is to design the system so that it responds to bumps but does not respond to rider induced forces. If the suspension responds to the rider's forces, it may be absorbing valuable energy which could otherwise be helping to propel the rider and bike faster. In addition, such a suspension system could result in a strange, uncomfortable ride.

Typically a rear suspension system may include a rear rotatable wheel carrier, a frame chassis, carrier manipulation linkages, and a shock-absorbing mechanism that cooperate to dampen the jarring effects that small and large bumps can have on a rider. When a bump force is applied to the rear wheel carrier, the rear wheel carrier and carrier manipulation linkages control the direction of the rear wheel carrier, the shock absorber controls how much force it takes to move the rear wheel carrier, and the damper controls how fast the rear wheel carrier can move in each direction.

While bump damping may improve rider comfort, prior suspension designs have undesirably wasted rider energy by extending or compressing the rear wheel carrier in response to rider acceleration or deceleration.

It is an object of a preferred form of the present invention to go at least some way towards addressing one or some of these problems. While this is an object of a preferred embodiment, it should not be seen as a limitation on the scope of the invention as claimed. The object of the invention per se is simply to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in the United States of America in any other country.

The term "comprising" and derivatives thereof, eg "comprises", if and when used herein in relation to a combination of features should not be taken as excluding the possibility that the combination may have further unspecified features. For example, a statement that an arrangement "comprises" certain parts does not mean that it cannot also, optionally, have additional parts.

SUMMARY OF THE INVENTION

According to one aspect of the invention there is provided a rear suspension for a bicycle comprising:

- a swingarm having a front and rear end and wherein the rear end is configured to attach to a rear wheel of a bicycle;
- an upper and lower link both adapted to pivotally connect the swing arm to the frame of a bicycle; and
- a jackshaft having a drive side and a non drive side sprocket and being connected to the front end of the swingarm;

the suspension configured such that when in use with a bicycle, a chain connects a drive side front crankset to the drive side jackshaft sprocket and a second chain connects the non drive side jackshaft sprocket to a rear wheel sprocket and wherein the arrangement allows the rear wheel of the bicycle to move rearward and upward in use.

Preferably there is substantially no chain lengthening of the chain connecting the non drive side jackshaft sprocket and the rear wheel sprocket when in use.

Preferably the upper link is an upper carrier manipulation link having a forward pivot that is connected to the frame and a rear pivot that is connected to the swing arm and the lower link is a lower carrier manipulation link having a forward pivot that is connected to the frame and rear pivot that is connected to the swingarm.

Preferably wherein a line intersecting the forward and rear pivot of the upper carrier manipulation linkage and a line intersecting the forward and rear pivot of the lower carrier manipulation linkage both intersect at an instant centre and wherein the instant centre is forward of the centre of rotation of the jackshaft and remains ahead of an centre of rotation of the jackshaft as the suspension compresses and decompresses in use.

Preferably wherein in use compression of the suspension rotates both the upper carrier manipulation linkage and the rear carrier manipulation linkage clockwise.

Preferably wherein the upper carrier manipulation link is pivotally connected the upper end of a rear shock and the lower end of the shock is pivotally connected to the frame of a bicycle when in use.

Preferably wherein in use with a bicycle the rear wheel path moves rearward and upward.

In another aspect of the invention there is provided a rear suspension for a bicycle comprising:

- a swingarm having a front and rear end and wherein the rear end is configured to attach to a rear wheel of a bicycle;
- an upper and lower link both adapted to pivotally connect the swing arm to the frame of a bicycle; and
- a jackshaft idler having a drive side sprocket and being connected to the front end of the swingarm;

the suspension configured such that when in use with a bicycle, a chain connects a drive side front crankset to the drive side jackshaft sprocket and to a rear wheel sprocket and wherein the arrangement allows the rear wheel of the bicycle to move rearward and upward in use.

Preferably the upper link is an upper carrier manipulation link having a forward pivot that is connected to the frame and a rear pivot that is connected to the swing arm and the lower link is a lower carrier manipulation link having a forward pivot that is connected to the frame and rear pivot that is connected to the swingarm.

Preferably wherein a line intersecting the forward and rear pivot of the upper carrier manipulation linkage and a line intersecting the forward and rear pivot of the lower carrier manipulation linkage both intersect at an instant centre and wherein the instant centre is forward of the centre of rotation of an idler and remains ahead of the idler as the suspension compresses and decompresses in use.

Preferably wherein in use compression of the suspension rotates both the upper carrier manipulation linkage and the lower carrier manipulation linkage clockwise.

Preferably wherein the upper carrier manipulation link is pivotally connected the upper end of a rear shock and the lower end of the shock is pivotally connected to the frame of a bicycle when in use.

Preferably wherein in use with a bicycle the rear wheel path moves rearward and upward.

Preferably wherein in use with a bicycle the rear wheel path moves substantially equally between rearward and upward.

In another aspect of the invention there is provided a bicycle having a rear suspension as previously described.

Preferably the bicycle is a mountain bike.

These and other features, objects and advantages of the present invention will be readily apparent to persons of ordinary skill in the art upon reading the entirety of this disclosure, which includes the accompanying drawings and claims.

BRIEF DESCRIPTION OF THE DRAWINGS

Some preferred embodiments of the invention will now be described by way of example and with reference to the accompanying drawings and graphs, of which.

DETAILED DESCRIPTION

The present invention relates to a rear suspension for a bicycle. References to bicycle throughout the specification relate to any type of bicycle including but not limited to mountain bicycles, utility bicycles, racing bicycles, touring bicycles, BMXs etc.

Those skilled in the art will appreciate that the use of the term "conventional drive train design" is used to generally describe a suspension mountain bike frame that has a chain set that extends from the front chassis drive chain ring to the rear wheel drive sprocket and incorporates a rear derailleur to maintain chain tension. The chain set generally forms one single continuous loop.

Figure 1:
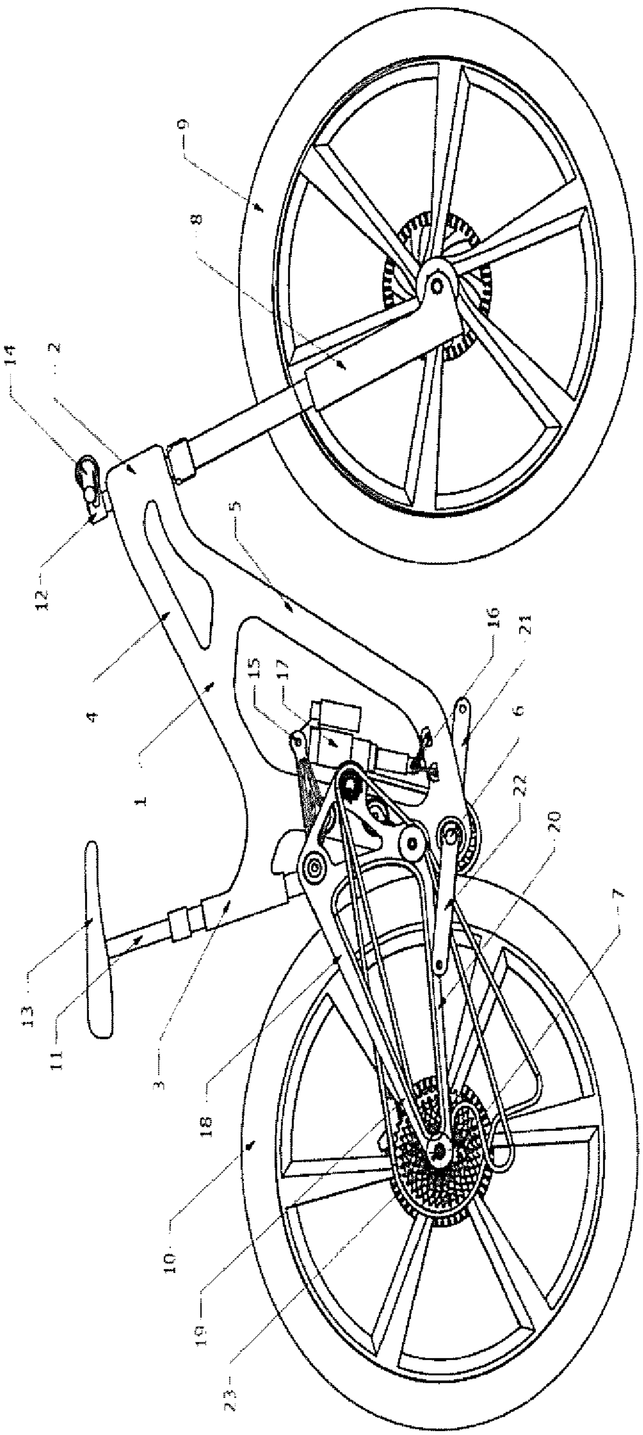
FIG. 1 is a side view of a bicycle with a rear suspension.

FIG. 1 shows an embodiment of a full suspension mountain bike frame in accordance with the present disclosure that includes; a frame chassis (1), a head tube (2), a seat tube (3), a top tube (4), a down tube (5), a bottom bracket (6), a derailleur hanger (7), a fork (8), a front wheel (9), a rear wheel (10), a seat post (11), a stem (12), a seat (13), a handlebar (14), a upper carrier manipulation link upper shock pivot (15), a lower frame shock pivot (16), a rear shock (17), a rear rotatable wheel carrier (18), a rear rotatable wheel carrier seat stay (19), a rear rotatable wheel carrier chain stay (20), non-drive side crank (22), rear wheel centre (23). Although referred to as a rear rotatable wheel carrier (18) those skilled in the art will realise that this can also be referred to as a swingarm (18) and is referred to a swingarm (18) in other parts of the specification and claims.

Figure 2:
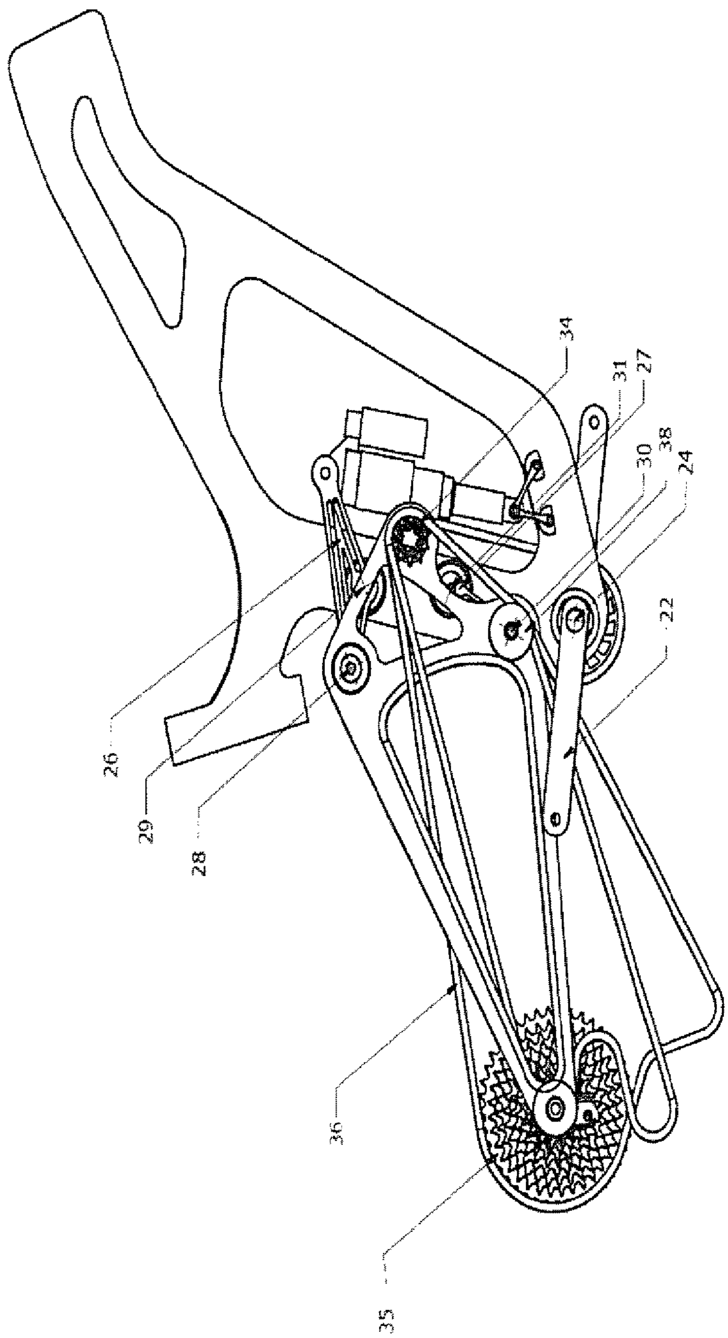
FIG. 2 is a side view of the non drive side of the rear suspension.

FIG. 2 shows an embodiment of a full suspension mountain bike frame in accordance with the present disclosure that includes; a non drive side crank (22), a bottom bracket centre (24), a upper carrier manipulation link (26), a lower carrier manipulation link (27), a upper carrier manipulation link rear pivot (28), a upper carrier manipulation link forward pivot (29), a lower carrier manipulation link rear pivot (30), a lower carrier manipulation link forward pivot (31), a non-drive side jackshaft sprocket (34), a rear wheel drive sprocket (35), a chainset connecting the non drive side jackshaft sprocket to the rear wheel drive sprocket (36), a non drive side chain return pulley (38).

Figure 3:
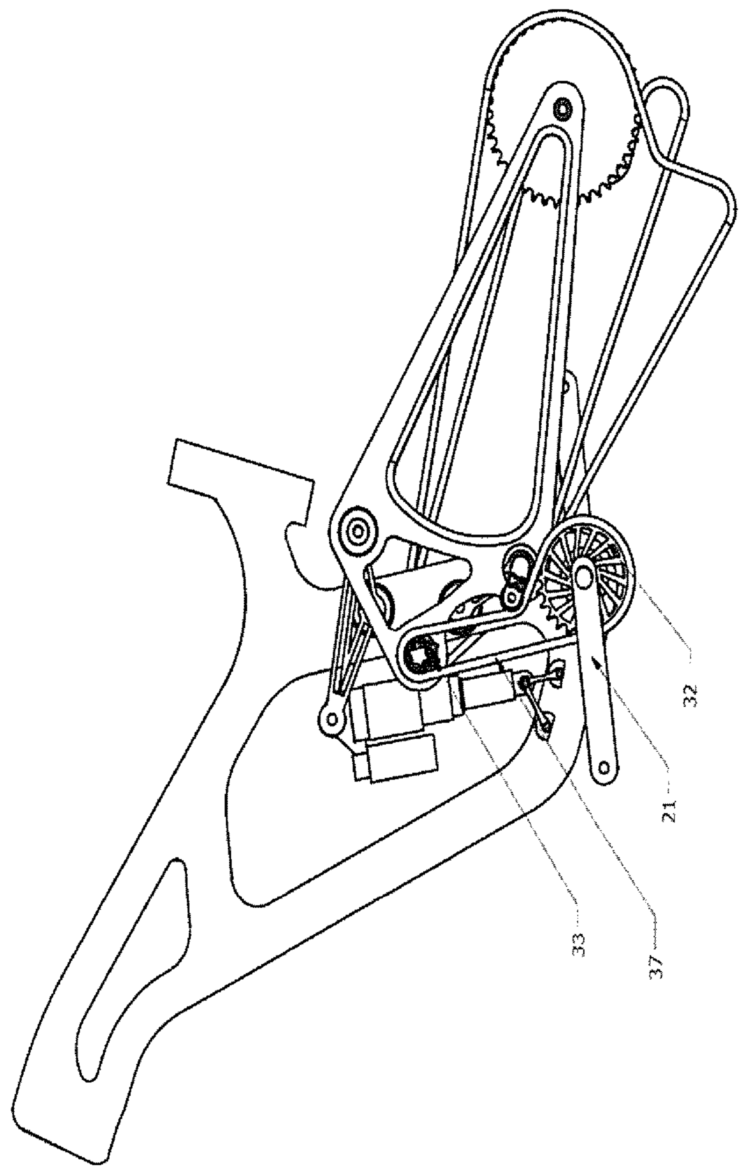
FIG. 3 is a perspective side view of the drive side of the rear suspension.

FIG. 3 show an embodiment of the present disclosure that includes; a drive side crankset (21), a frame chassis drive chainring (32), a drive side jackshaft sprocket (33), a chainset connecting the drive side jackshaft sprocket to the frame chassis drive chainring (37).

Figure 4:
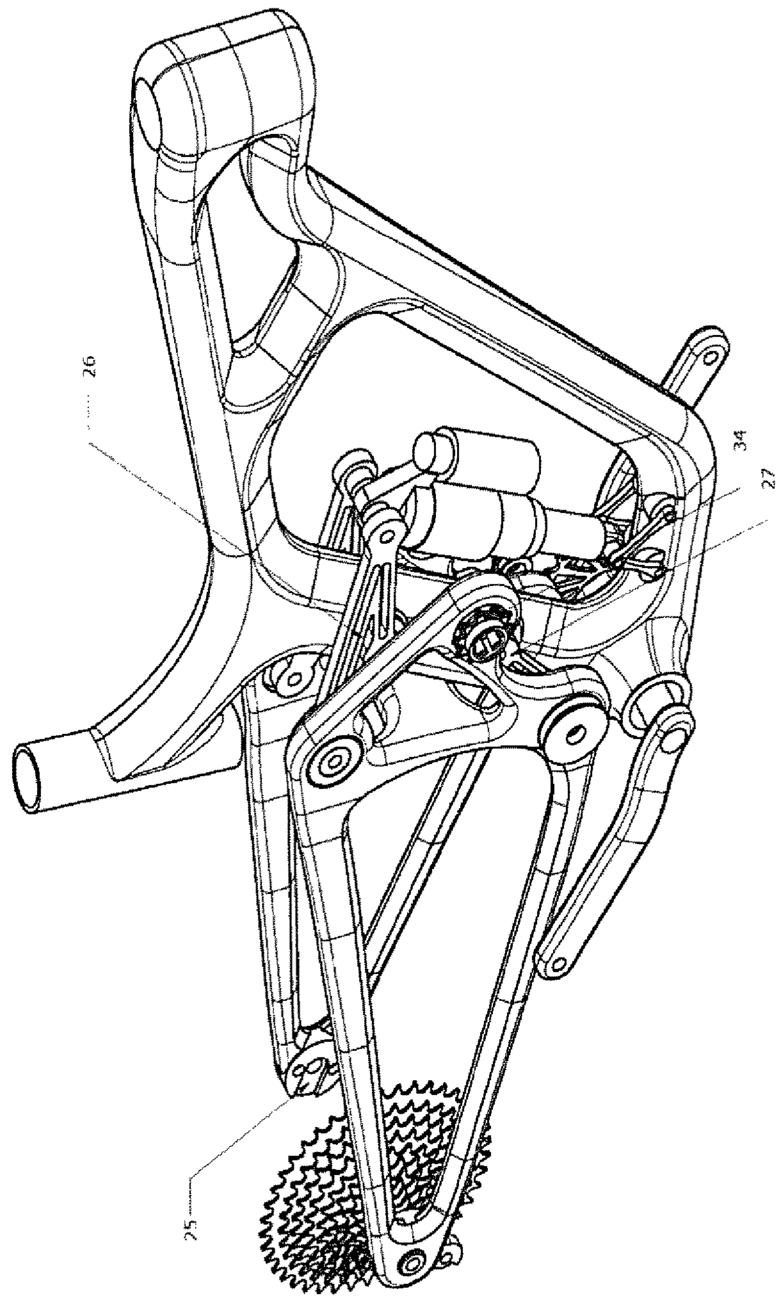
FIG. 4 is a perspective view of the non drive side of the rear suspension.

FIG. 4 show an embodiment of the present disclosure that includes; an upper carrier manipulation link (26), a lower carrier manipulation link (27), a non-drive side jackshaft sprocket (34).

Figure 5:
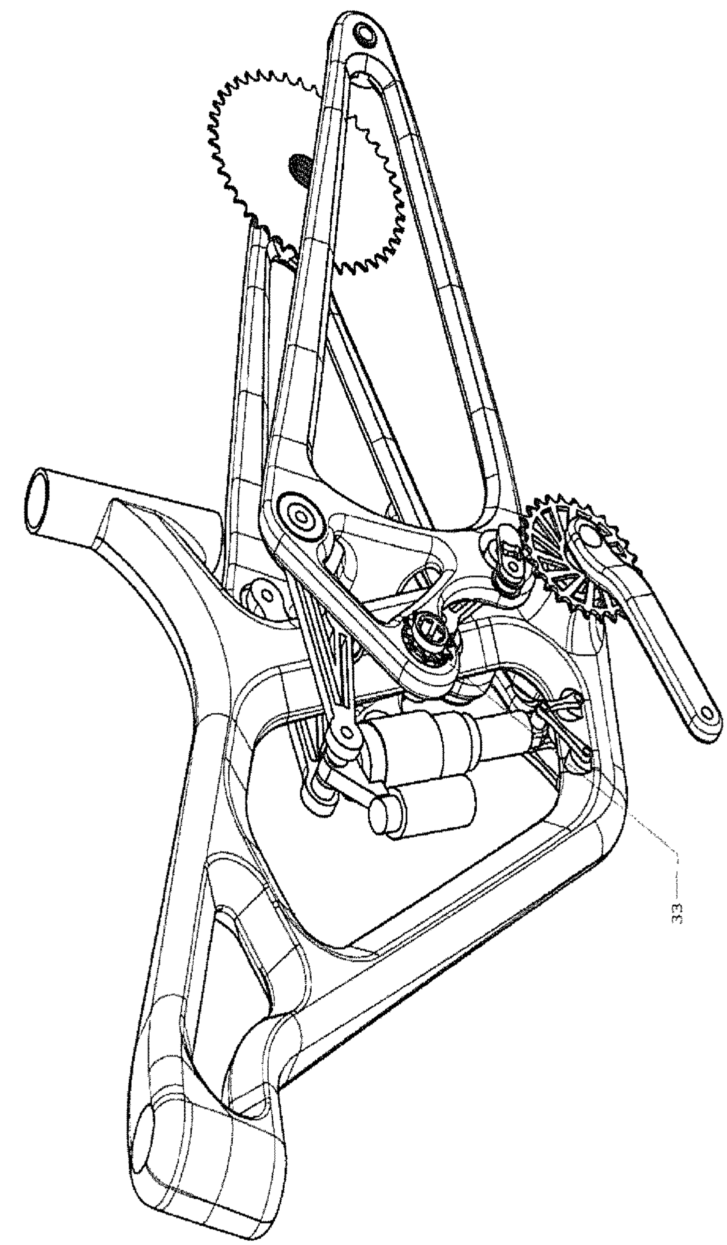
FIG. 5 is an alternative perspective view of the drive side of the rear suspension.

FIG. 5 shows an embodiment of the present disclosure that includes; a drive side jackshaft sprocket (33).

The front chassis and the rear rotatable wheel carrier can be differently configured while remaining within the scope of this disclosure. As a non-limiting example, the front triangle need not include a conventional top tube, down tube, and seat tube. FIG. 1 shows a bicycle frame having a suspension system in accordance with an embodiment of the present disclosure that does not have a seat tube that extends from the top tube to the bottom bracket as is typical with many suspension frames.

As is well understood in the art of bicycle design, a bottom bracket can hold a bottom bracket bearing assembly, which allows a crank assembly to rotate relative to the frame. The crank assembly can be attached to pedals, which a rider can use to rotate the crank assembly. The crank assembly also can be attached to one or more chainrings. The rear wheel insertion slots can be used to hold a rear wheel, which may include one or more drive sprockets. A first chainset connects the frame chassis drive chainring to a drive side jackshaft sprocket, a second chainset connects the non drive side jackshaft sprocket to the rear wheel drive sprocket. The drive side and non drive side jackshaft sprockets are attached to a splined jackshaft axle and these cannot rotate independently of each other. A rider pedalling the crank assembly can drive the chain extending between the chainrings and the drive sprockets, thus causing the rear wheel to rotate. In embodiments that include two or more rear wheel drive sprockets, a rear derailleur can be used to move the chain from one sprocket to another. In this way, the gearing of the bicycle can be changed. This particular embodiment of the design does not include any provision for multiple chainrings or for shifting the chain between multiple chainrings. It is possible however to alter the size of the drive chainring and to alter the size of the drive and non-drive jackshaft sprockets. In this way the overall gearing to the rear wheel can be altered.

As is well understood in the art of bicycle design when a rider pedals a bicycle the force applied to the pedals tends to be greater at certain parts of the pedal stroke than others. The pedal force varies in a sinusoidal manner from close to zero when the cranks are vertical to some maximum when the cranks are nearly horizontal. This variable output results in the rider and the bicycle accelerating forward in pulses. These pulses coincide with maximum pedal force output.

When a bicycle accelerates, a weight transfer toward the rear wheel occurs. This is observed by way of the front suspension extending and the rear suspension compressing (squatting). Conversely, under braking, there is a weight transfer toward the front of the bicycle. This is observed by way of the front suspension compressing and the rear suspension extending (rising). The extent to which a suspension design resists these squat and rise tendencies is referred to as anti-squat and anti-rise.

Conventional drivetrain designs allow the suspension system to react in such a way that chain tension (from pedalling forces) causes an extension force in the suspension system. This extension force can counteract the compression that would otherwise occur under weight transfer.

Anti-squat can be determined quantitatively and indicates the rear suspension systems capacity to resist compression or extension when a bicycle accelerates. Anti-rise can be determined quantitatively and indicates the rear suspension systems capacity to resist compression or extension when a bicycle decelerates.

This method of calculating anti-squat and anti-rise graphically is described in Tony Foale's book 'Motorcycle Handling and Chassis Design: the art and science', by Dave Weagle's patent (U.S. Pat. No. 7,128,329), and by i-Track on their website at http://www.i-tracksuspension.com.

A graphical means exists which allows the designer to quantitatively determine the anti-squat and anti-rise performance of a particular suspension design. Anti-squat is expressed as a percentage. 0% anti-squat represents no resistance to accelerative squat. 100% anti-squat represents a design that neither compresses nor extends as a result of acceleration. Normally the percentage anti-squat varies as the suspension system compresses. A graphical representation of % anti-squat versus % of rear suspension travel for a particular suspension design is referred to as the acceleration response. The acceleration response varies considerably between suspension designs. The acceleration response varies according to gear selection also.

Conventional drivetrain designs allow the suspension system to react in such a way that weight transfer toward the front wheel causes a compression force in the suspension system. This compression force counteracts the extension that would otherwise occur under weight transfer. As indicated above this anti-rise performance can be quantified and this is normally expressed as a percentage. 0% anti-rise represents no resistance to decelerative rise. 100% anti-rise represents a design that neither compresses nor extends as a result of deceleration. Normally the percentage anti-rise varies as the suspension system compresses. A graphical representation of % anti-rise versus % of rear suspension travel for a particular suspension design is normally referred to as the braking response. The braking response varies considerably between suspension designs.

Figure 6:
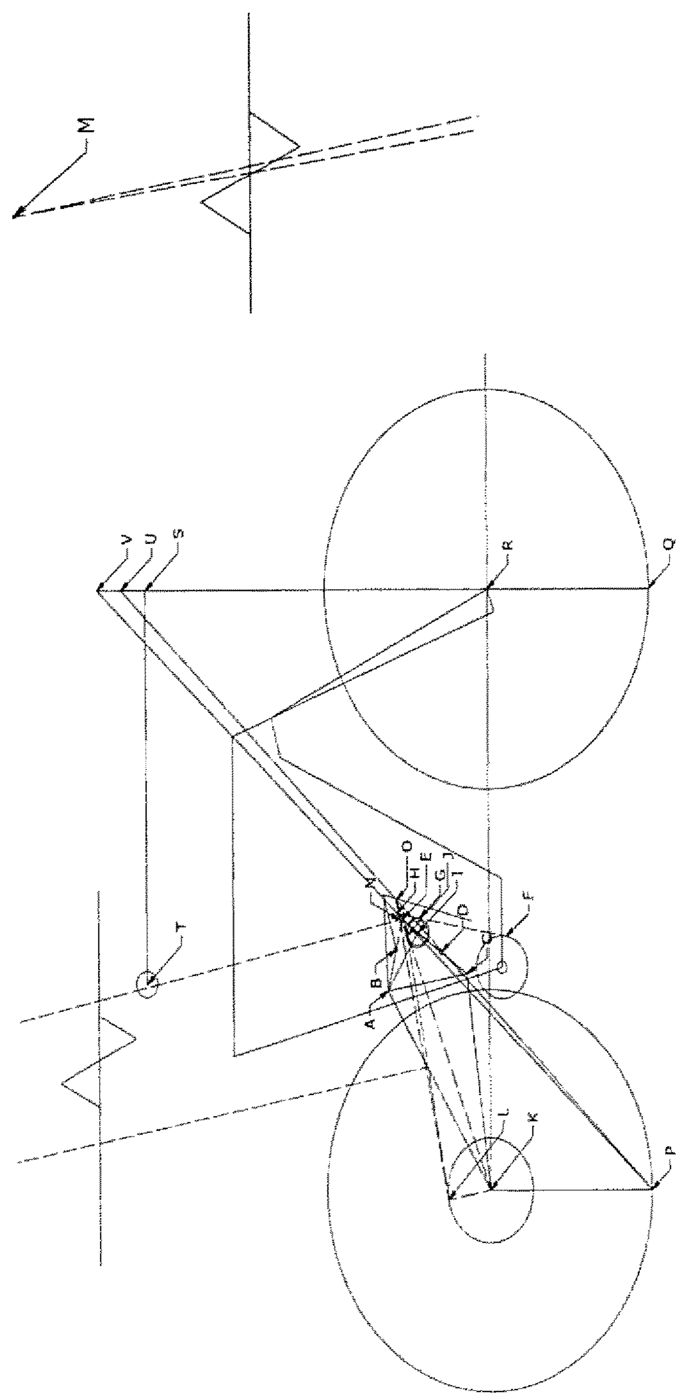
FIG. 6 is a side view of a bicycle with rear suspension illustrating how anti-squat can be determined.
Figure 7:
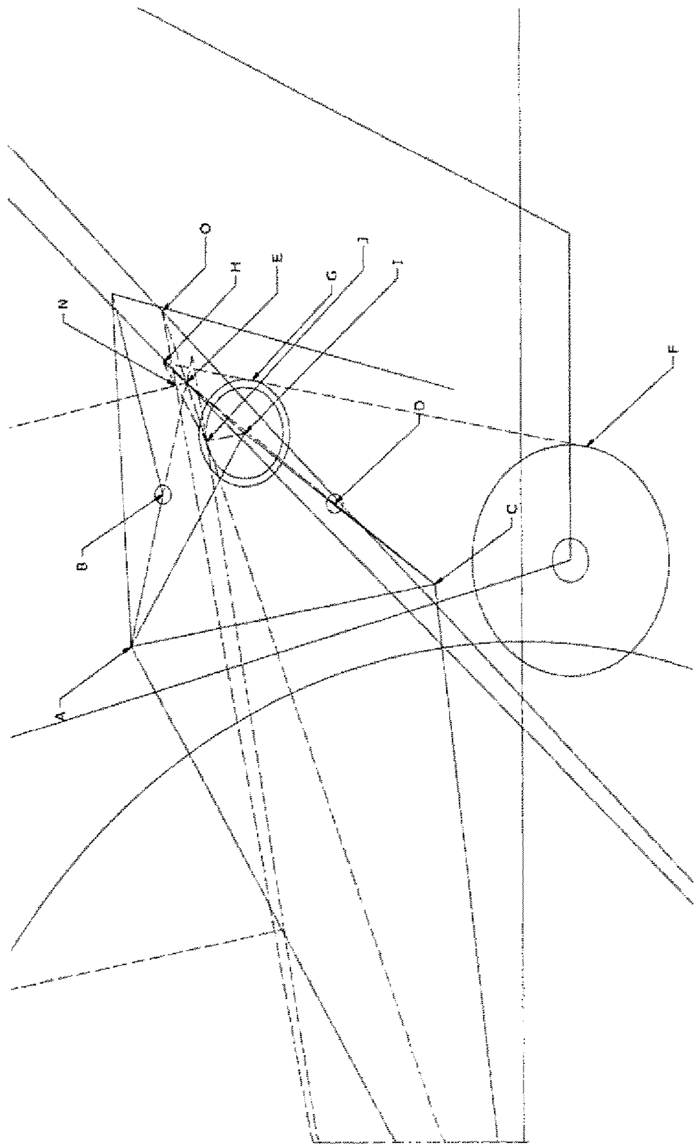
FIG. 7 is a detailed side view of a bicycle with rear suspension illustrating how anti-squat can be determined.

FIG. 6 and FIG. 7 present a graphical method useful to determine the level of anti-squat that an embodiment of the present invention will exhibit at a predetermined level of suspension compression which includes;

A line connecting points A and B and line connecting points C and D and the intersect of these lines being labelled E.

A line connecting points F and G and line connecting points I and E and the intersect of these lines being labelled H.

A line connecting points I and J and line connecting points K and L and the intersect of these lines being labelled M.

A line connecting points J and H and line connecting points M and E and the intersect of these lines being labelled N.

A line connecting points L and N and line connecting points K and E and the intersect of these lines being labelled O.

A line connecting points P and O represents the squat force line. This line intersects at point U and represents the squat definition point.

A line connecting points P and E represents the rise force line. This line intersects at point V and represents the rise definition point.

A vertical line between points Q an S represents the squat/rise layout line.

The point T represents the centre of gravity of the rider and the bike and the line connecting points T and S represent the distance of the centre of gravity to the squat/rise layout line.

The squat value is calculated as the ratio of the measured squat distance versus the measured centre of gravity distance.

The rise value is calculated as the ratio of the measured rise distance versus the measured centre of gravity.

Figure 8:
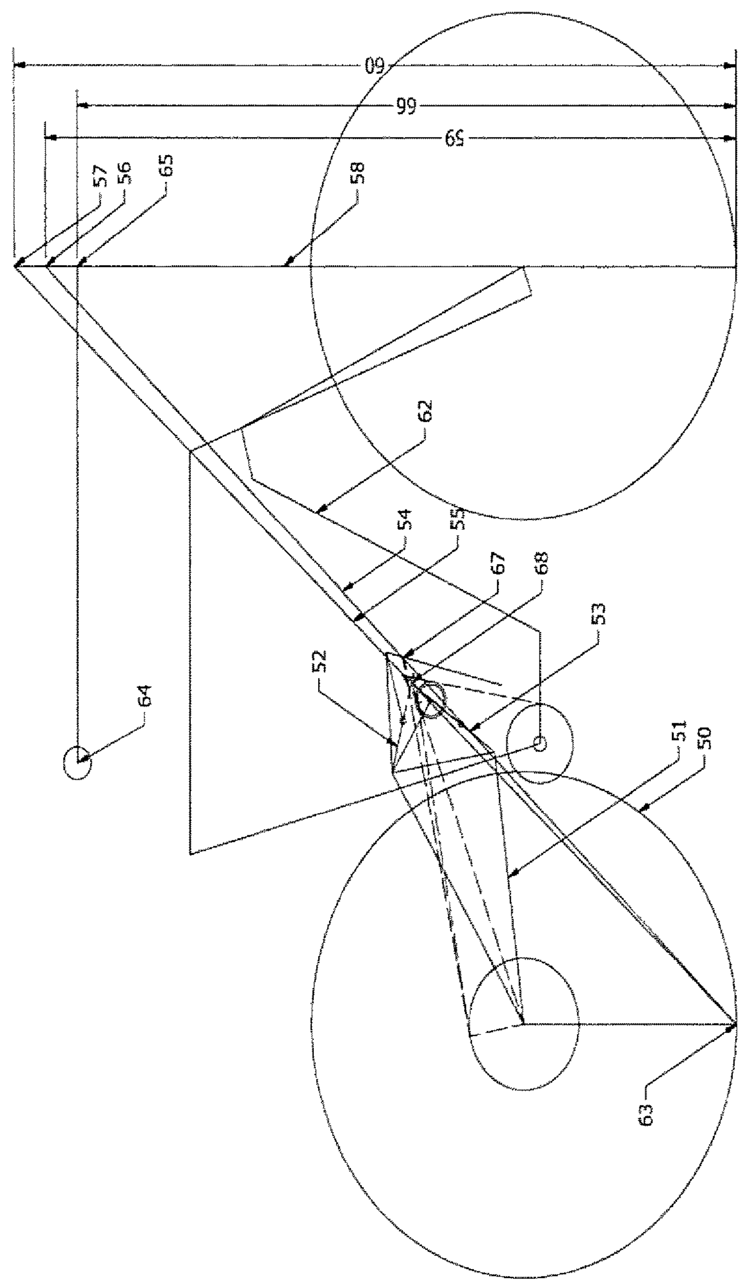
FIG. 8 is a side view of a bicycle with rear suspension illustrating anti-squat at 0 mm compression for a 30 (frame chassis drive chain ring)/12 (drive side jackshaft sprocket)/14 (non-drive side jackshaft sprocket)/50 (rear wheel drive sprocket) sprocket configuration.

FIG. 8 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 0% suspension compression and a 30 (frame chassis drive chain ring)/12 (drive side jackshaft sprocket)/14 (non-drive side jackshaft sprocket)/50 (rear wheel drive sprocket) sprocket configuration.

Figure 9:
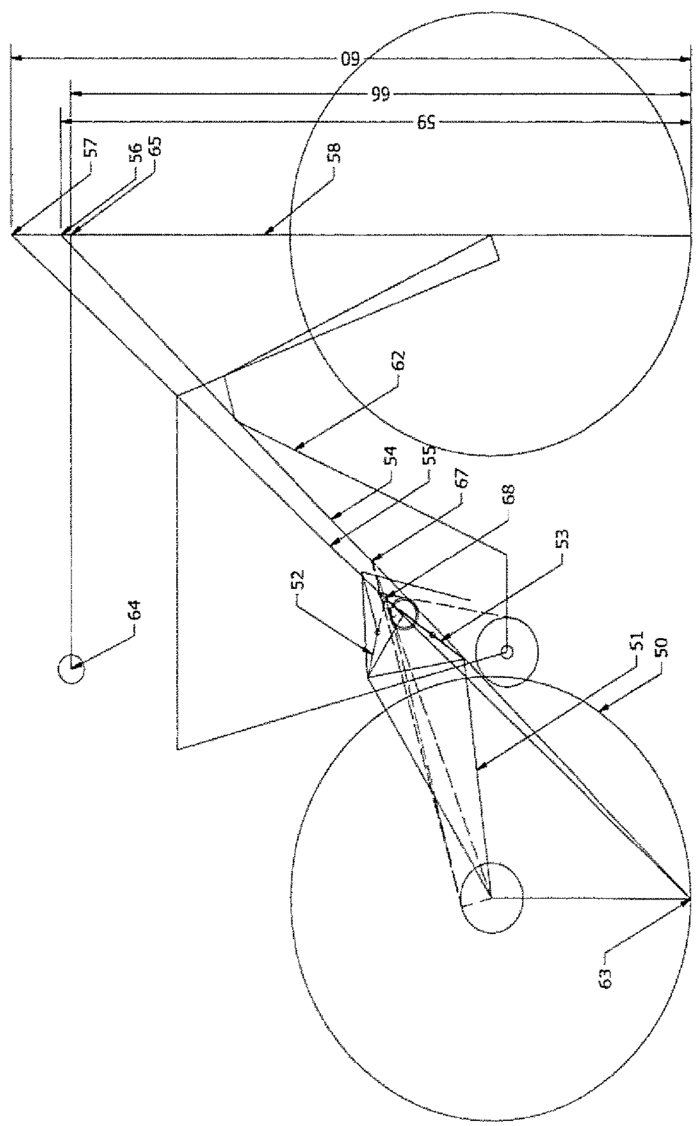
FIG. 9 is a side view of a bicycle with rear suspension illustrating anti-squat at 0 mm compression for a 30 (frame chassis drive chain ring)/12 (drive side jackshaft sprocket)/14 (non-drive side jackshaft sprocket)/30 (rear wheel drive sprocket) sprocket configuration.

FIG. 9 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 0% suspension compression and a 30 (frame chassis drive chain ring)/12 (drive side jackshaft sprocket)/14 (non-drive side jackshaft sprocket)/30 (rear wheel drive sprocket) sprocket configuration.

Figure 10:
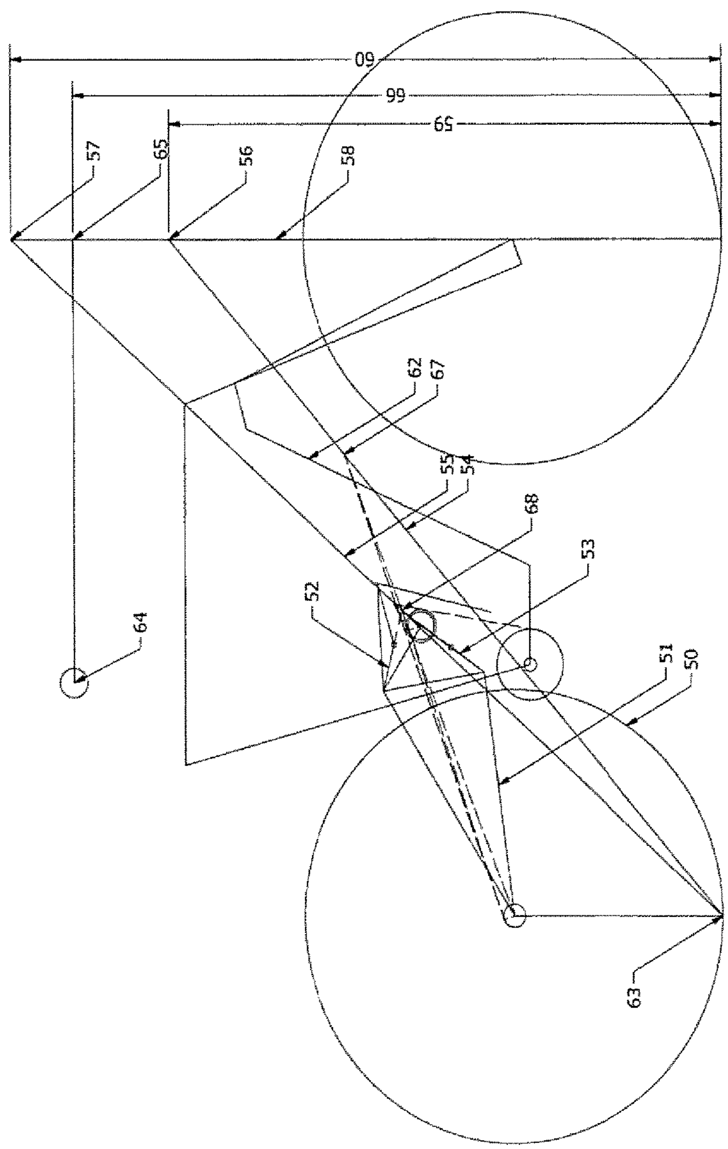
FIG. 10 is a side view of a bicycle with rear suspension illustrating anti-squat at 0 mm compression for a 30 (frame chassis drive chain ring)/12 (drive side jackshaft sprocket)/14 (non-drive side jackshaft sprocket)/10 (rear wheel drive sprocket) sprocket configuration.

FIG. 10 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 0% suspension compression and a 30 (frame chassis drive chain ring)/12 (drive side jackshaft sprocket)/14 (non-drive side jackshaft sprocket)/10 (rear wheel drive sprocket) sprocket configuration.

Figure 11:
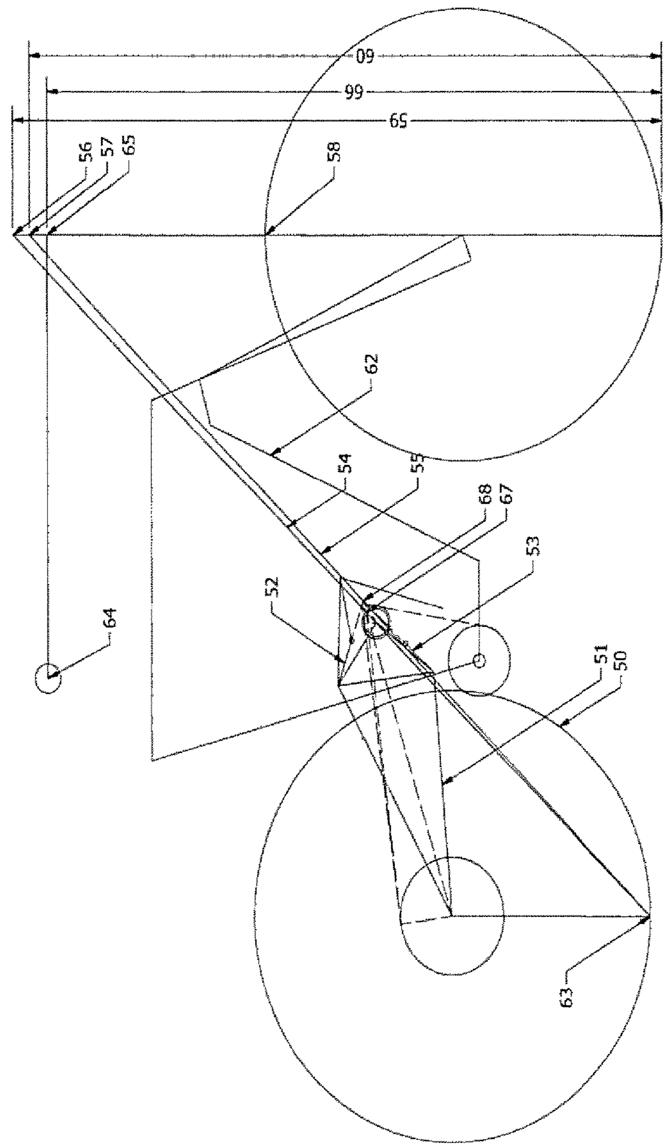
FIG. 11 is a side view of a bicycle with rear suspension illustrating anti-squat at 20 mm compression for a 30 (frame chassis drive chain ring)/12 (drive side jackshaft sprocket)/14 (non-drive side jackshaft sprocket)/50 (rear wheel drive sprocket) sprocket configuration.

FIG. 11 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 20% suspension compression and a 30 (frame chassis drive chain ring)/12 (drive side jackshaft sprocket)/14 (non-drive side jackshaft sprocket)/50 (rear wheel drive sprocket) sprocket configuration.

Figure 12:
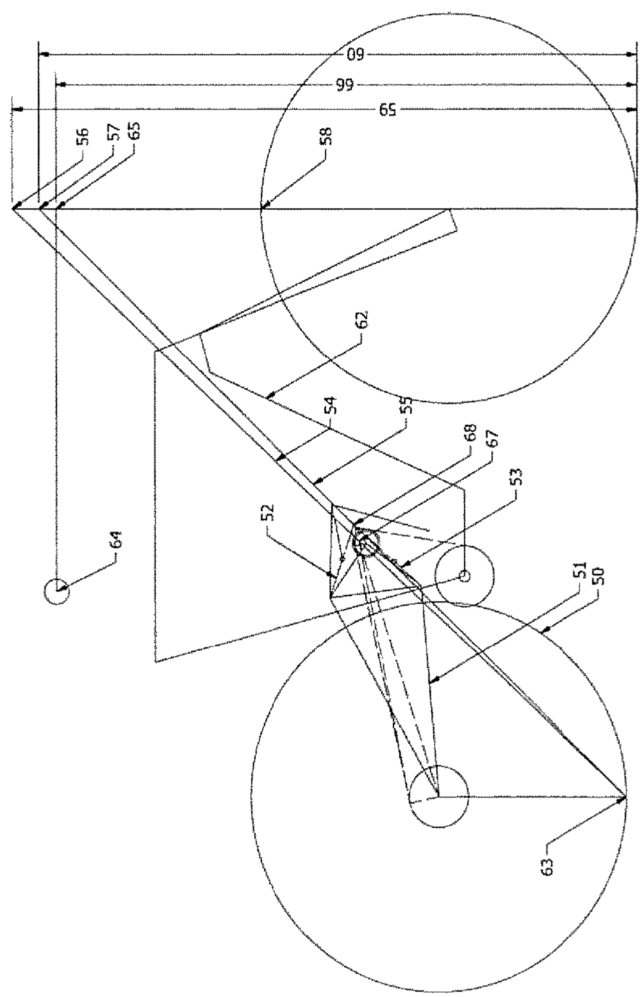
FIG. 12 is a side view of a bicycle with rear suspension illustrating anti-squat at 20 mm compression for a 30 (frame chassis drive chain ring)/12 (drive side jackshaft sprocket)/14 (non-drive side jackshaft sprocket)/30 (rear wheel drive sprocket) sprocket configuration.

FIG. 12 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 20% suspension compression and a 30 (frame chassis drive chain ring)/12 (drive side jackshaft sprocket)/14 (non-drive side jackshaft sprocket)/30 (rear wheel drive sprocket) sprocket configuration.

Figure 13:
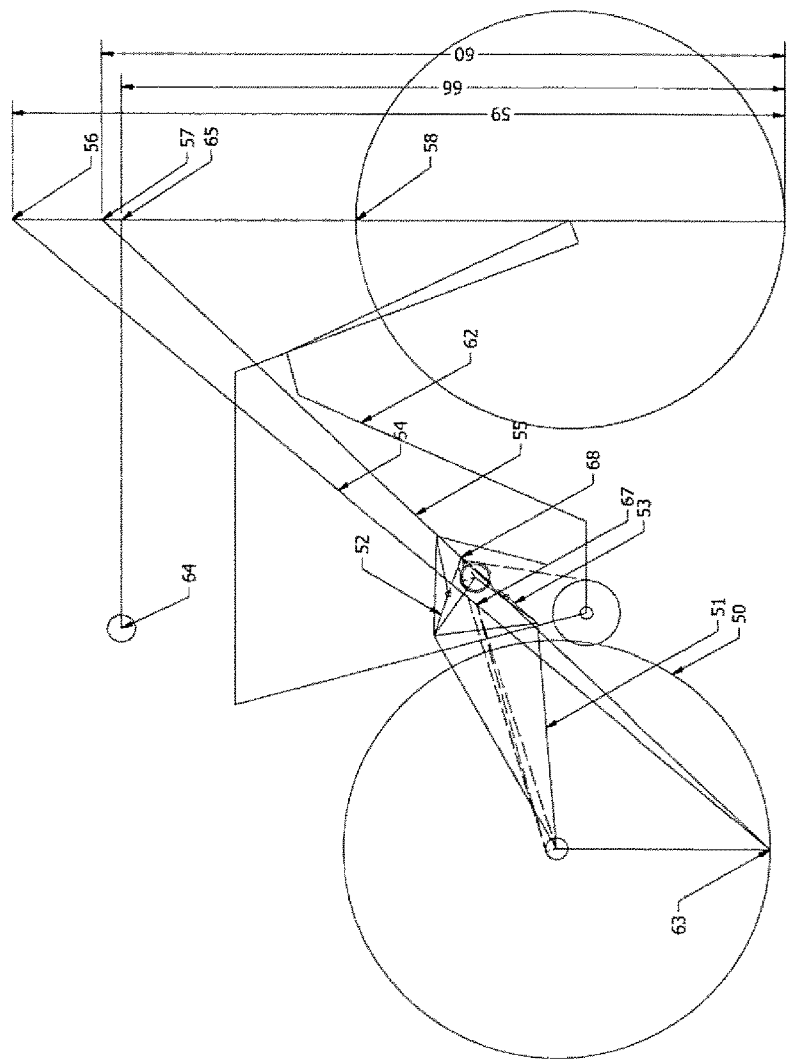
FIG. 13 is a side view of a bicycle with rear suspension illustrating anti-squat at 20 mm compression for a 30 (frame chassis drive chain ring)/12 (drive side jackshaft sprocket)/14 (non-drive side jackshaft sprocket)/10 (rear wheel drive sprocket) sprocket configuration.

FIG. 13 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 20% suspension compression and a 30 (frame chassis drive chain ring)/12 (drive side jackshaft sprocket)/14 (non-drive side jackshaft sprocket)/10 (rear wheel drive sprocket) sprocket configuration.

Figure 14:
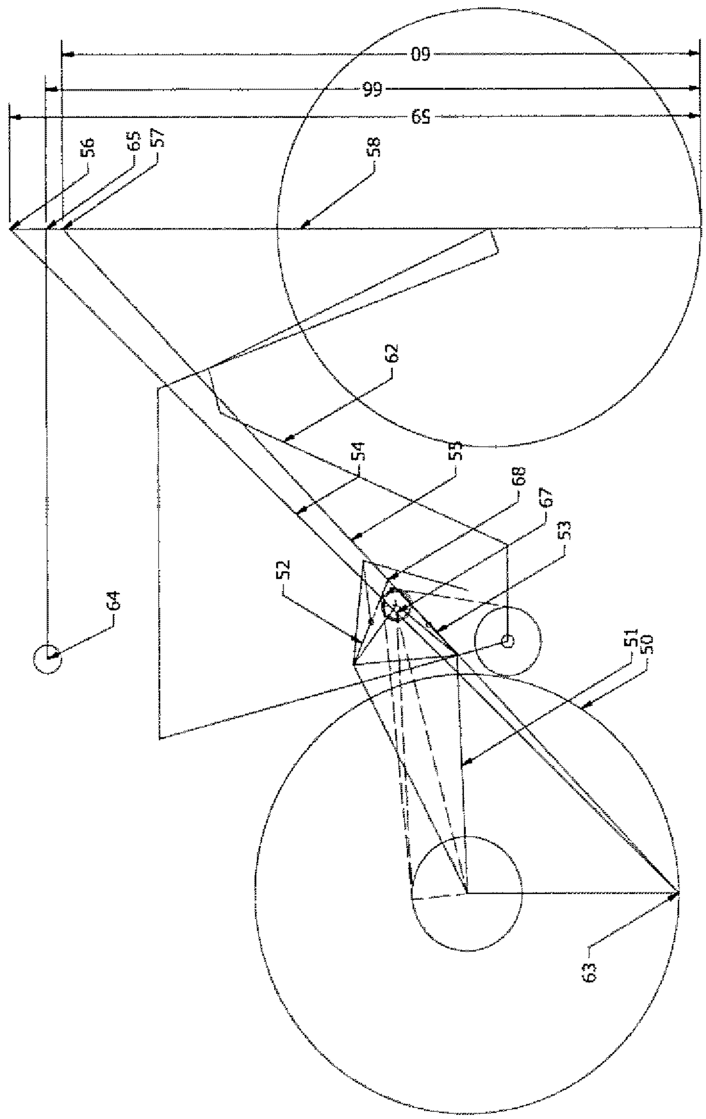
FIG. 14 is a side view of a bicycle with rear suspension illustrating anti-squat at 40 mm compression for a 30 (frame chassis drive chain ring)/12 (drive side jackshaft sprocket)/14 (non-drive side jackshaft sprocket)/50 (rear wheel drive sprocket) sprocket configuration.

FIG. 14 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 40% suspension compression and a 30 (frame chassis drive chain ring)/12 (drive side jackshaft sprocket)/14 (non-drive side jackshaft sprocket)/50 (rear wheel drive sprocket) sprocket configuration.

Figure 15:
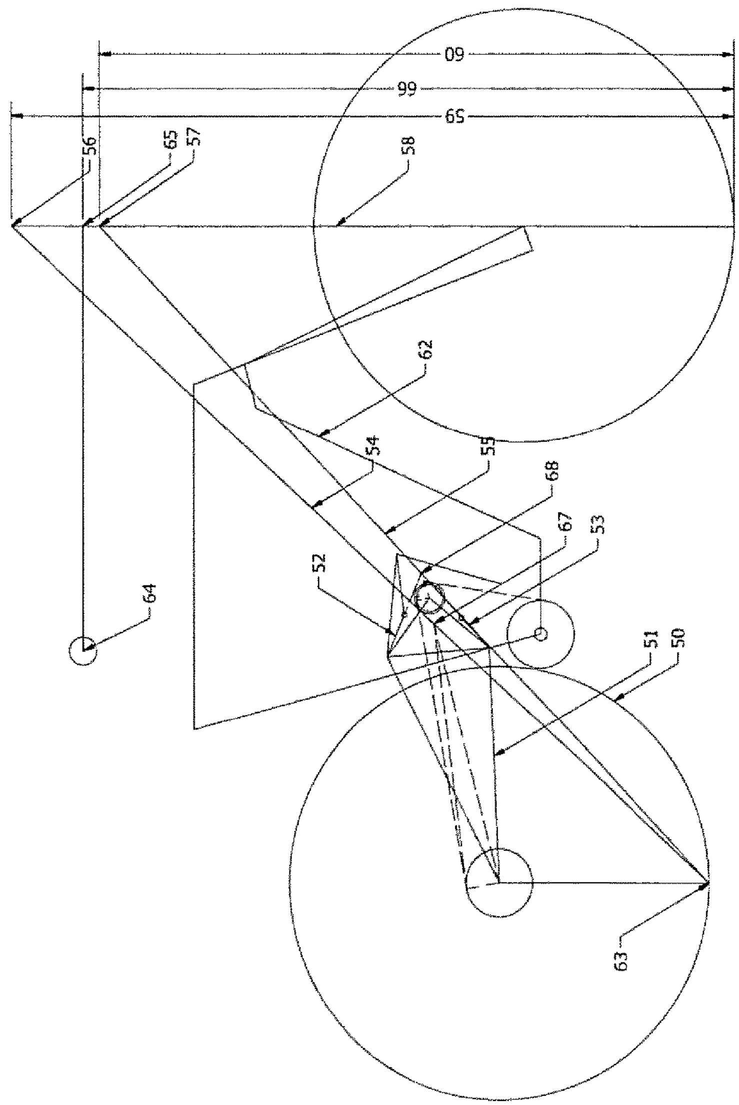
FIG. 15 is a side view of a bicycle with rear suspension illustrating anti-squat at 40 mm compression for a 30 (frame chassis drive chain ring)/12 (drive side jackshaft sprocket)/14 (non-drive side jackshaft sprocket)/30 (rear wheel drive sprocket) sprocket configuration.

FIG. 15 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 40% suspension compression and a 30 (frame chassis drive chain ring)/12 (drive side jackshaft sprocket)/14 (non-drive side jackshaft sprocket)/30 (rear wheel drive sprocket) sprocket configuration.

Figure 16:
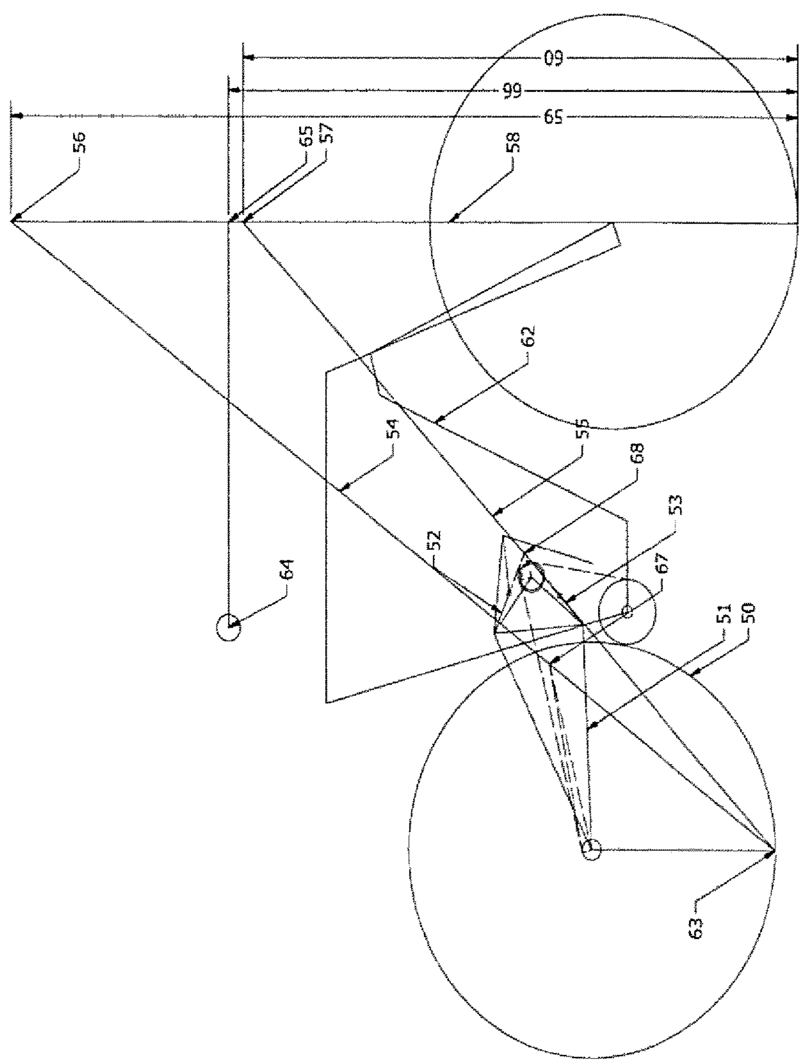
FIG. 16 is a side view of a bicycle with rear suspension illustrating anti-squat at 40 mm compression for a 30 (frame chassis drive chain ring)/12 (drive side jackshaft sprocket)/14 (non-drive side jackshaft sprocket)/10 (rear wheel drive sprocket) sprocket configuration.

FIG. 16 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 40% suspension compression and a 30 (frame chassis drive chain ring)/12 (drive side jackshaft sprocket)/14 (non-drive side jackshaft sprocket)/10 (rear wheel drive sprocket) sprocket configuration.

Figure 17:
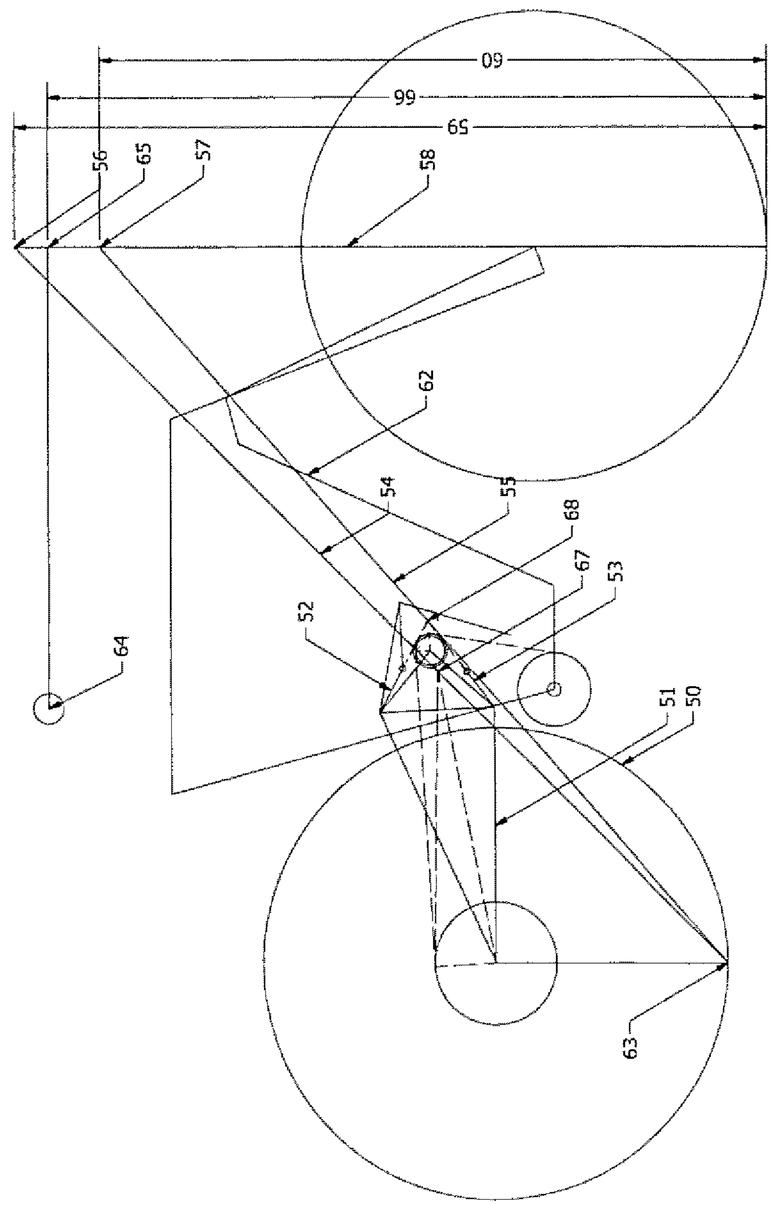
FIG. 17 is a side view of a bicycle with rear suspension illustrating anti-squat at 60 mm compression for a 30 (frame chassis drive chain ring)/12 (drive side jackshaft sprocket)/14 (non-drive side jackshaft sprocket)/50 (rear wheel drive sprocket) sprocket configuration.

FIG. 17 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 60% suspension compression and a 30 (frame chassis drive chain ring)/12 (drive side jackshaft sprocket)/14 (non-drive side jackshaft sprocket)/50 (rear wheel drive sprocket) sprocket configuration.

Figure 18:
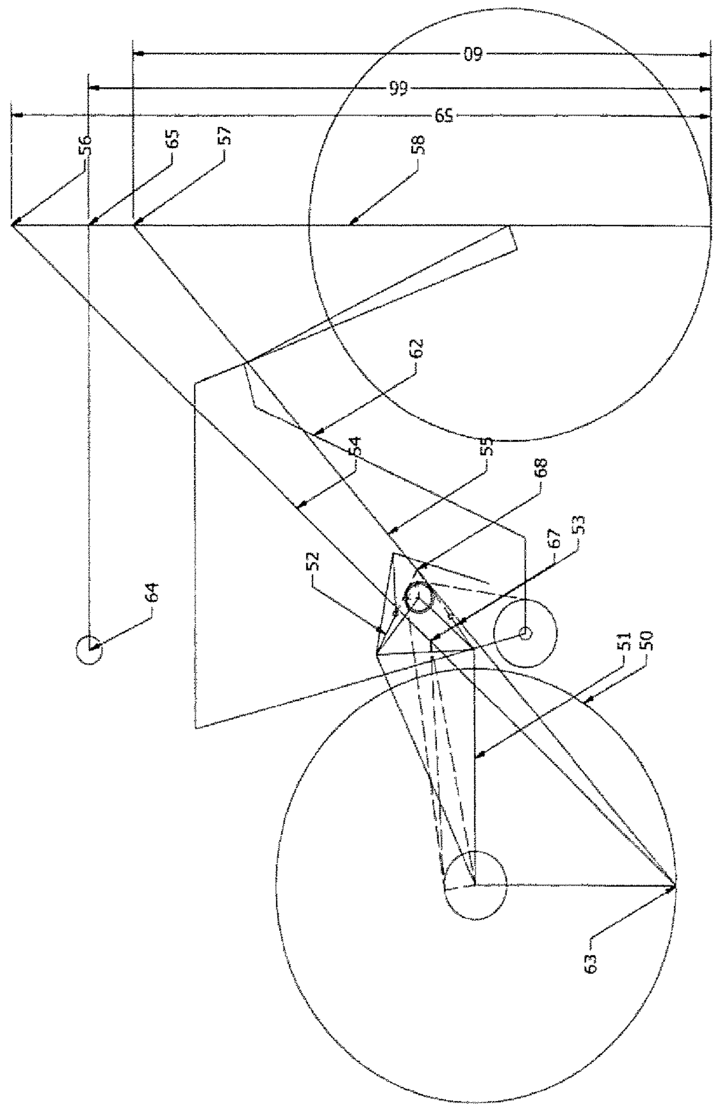
FIG. 18 is a side view of a bicycle with rear suspension illustrating anti-squat at 60 mm compression for a 30 (frame chassis drive chain ring)/12 (drive side jackshaft sprocket)/14 (non-drive side jackshaft sprocket)/30 (rear wheel drive sprocket) sprocket configuration.

FIG. 18 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 60% suspension compression and a 30 (frame chassis drive chain ring)/12 (drive side jackshaft sprocket)/14 (non-drive side jackshaft sprocket)/30 (rear wheel drive sprocket) sprocket configuration.

Figure 19:
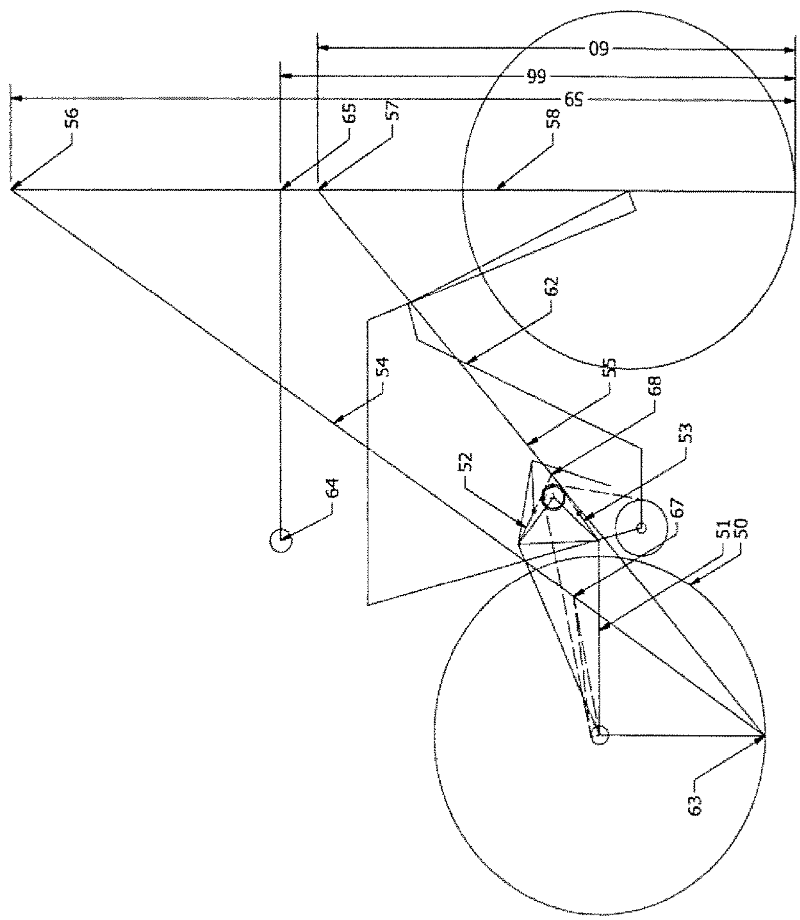
FIG. 19 is a side view of a bicycle with rear suspension illustrating anti-squat at 60 mm compression for a 30 (frame chassis drive chain ring)/12 (drive side jackshaft sprocket)/14 (non-drive side jackshaft sprocket)/10 (rear wheel drive sprocket) sprocket configuration.

FIG. 19 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 60% suspension compression and a 30 (frame chassis drive chain ring)/12 (drive side jackshaft sprocket)/14 (non-drive side jackshaft sprocket)/10 (rear wheel drive sprocket) sprocket configuration.

Figure 20:
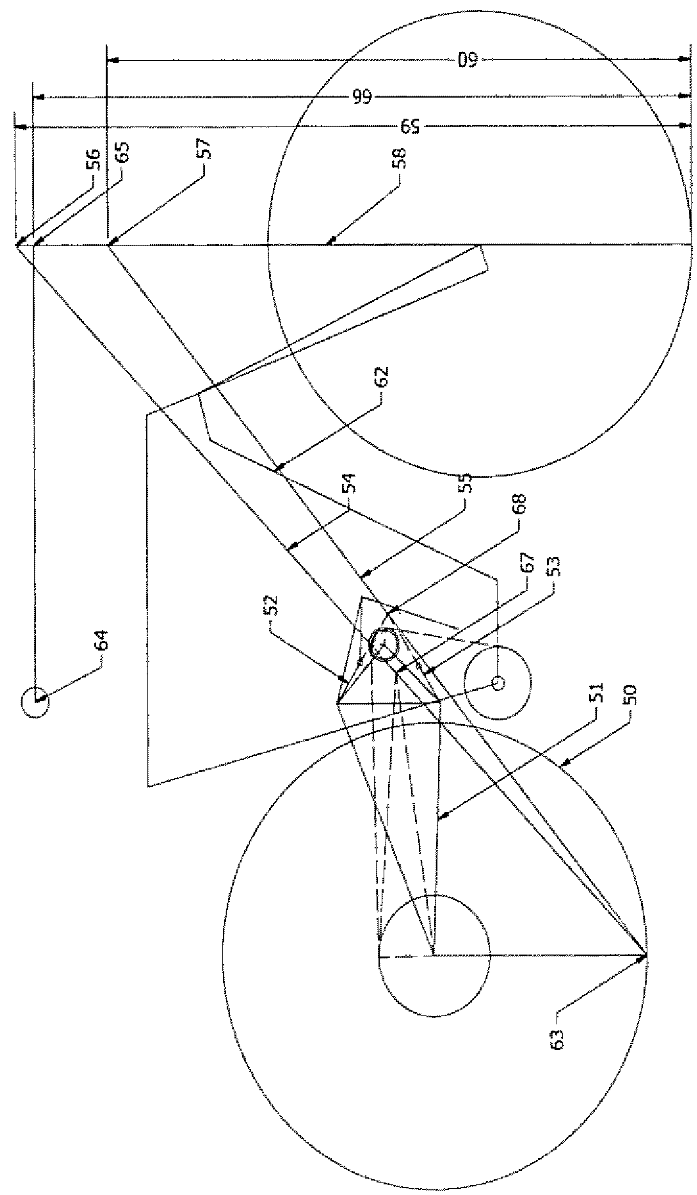
FIG. 20 is a side view of a bicycle with rear suspension illustrating anti-squat at 80 mm compression for a 30 (frame chassis drive chain ring)/12 (drive side jackshaft sprocket)/14 (non-drive side jackshaft sprocket)/50 (rear wheel drive sprocket) sprocket configuration.

FIG. 20 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 80% suspension compression and a 30 (frame chassis drive chain ring)/12 (drive side jackshaft sprocket)/14 (non-drive side jackshaft sprocket)150 (rear wheel drive sprocket) sprocket configuration.

Figure 21:
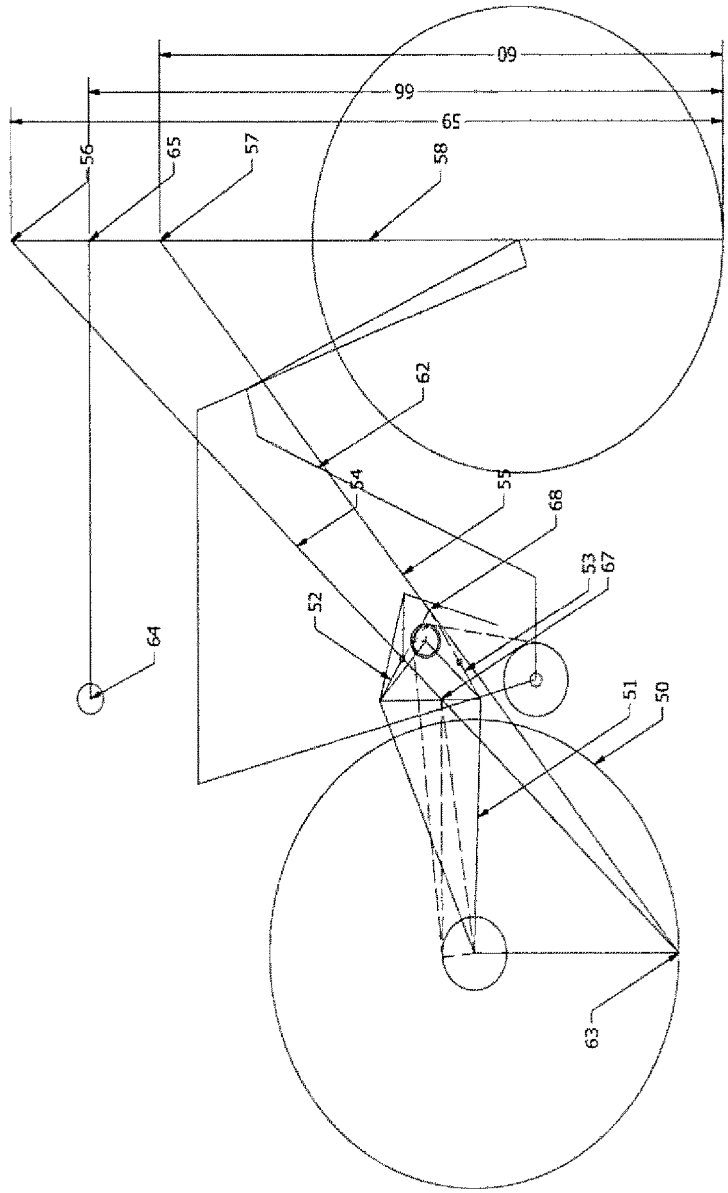
FIG. 21 is a side view of a bicycle with rear suspension illustrating anti-squat at 80 mm compression for a 30 (frame chassis drive chain ring)/12 (drive side jackshaft sprocket)/14 (non-drive side jackshaft sprocket)/30 (rear wheel drive sprocket) sprocket configuration.

FIG. 21 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 80% suspension compression and a 30 (frame chassis drive chain ring)/12 (drive side jackshaft sprocket)/14 (non-drive side jackshaft sprocket)/30 (rear wheel drive sprocket) sprocket configuration.

Figure 22:
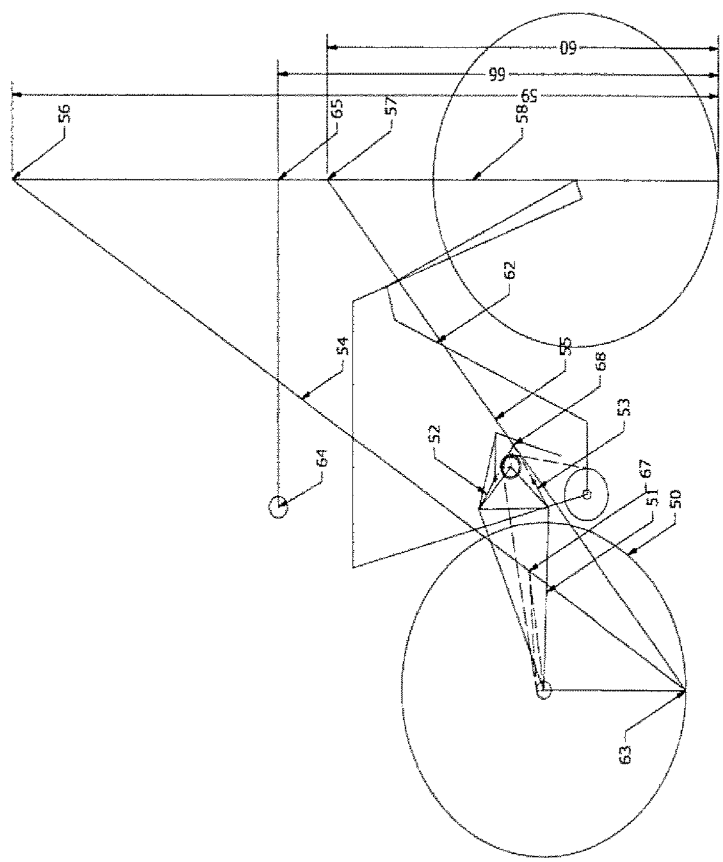
FIG. 22 is a side view of a bicycle with rear suspension illustrating anti-squat at 80 mm compression for a 30 (frame chassis drive chain ring)/12 (drive side jackshaft sprocket)/14 (non-drive side jackshaft sprocket)/10 (rear wheel drive sprocket) sprocket configuration.

FIG. 22 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 80% suspension compression and a 30 (frame chassis drive chain ring)/12 (drive side jackshaft sprocket)/14 (non-drive side jackshaft sprocket)/10 (rear wheel drive sprocket) sprocket configuration.

Figure 23:
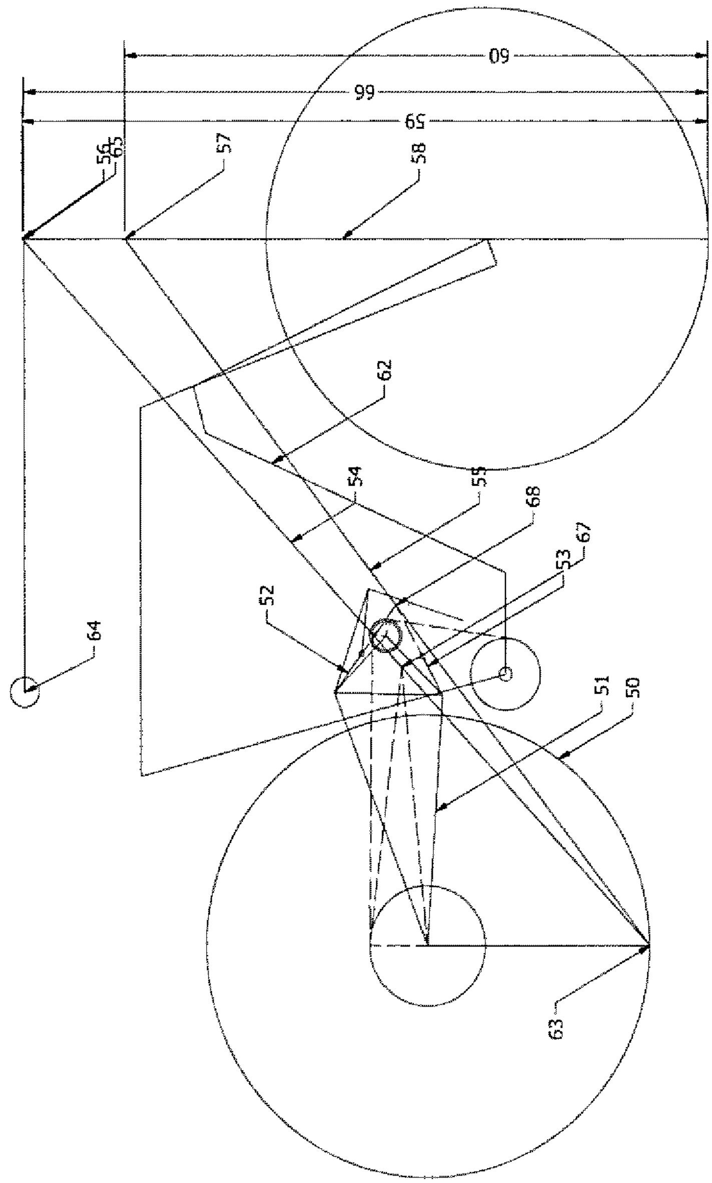
FIG. 23 is a side view of a bicycle with rear suspension illustrating anti-squat at 100 mm compression for a 30 (frame chassis drive chain ring)/12 (drive side jackshaft sprocket)/14 (non-drive side jackshaft sprocket)/50 (rear wheel drive sprocket) sprocket configuration.

FIG. 23 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 100% suspension compression and a 30 (frame chassis drive chain ring)/12 (drive side jackshaft sprocket)/14 (non-drive side jackshaft sprocket)/50 (rear wheel drive sprocket) sprocket configuration.

Figure 24:
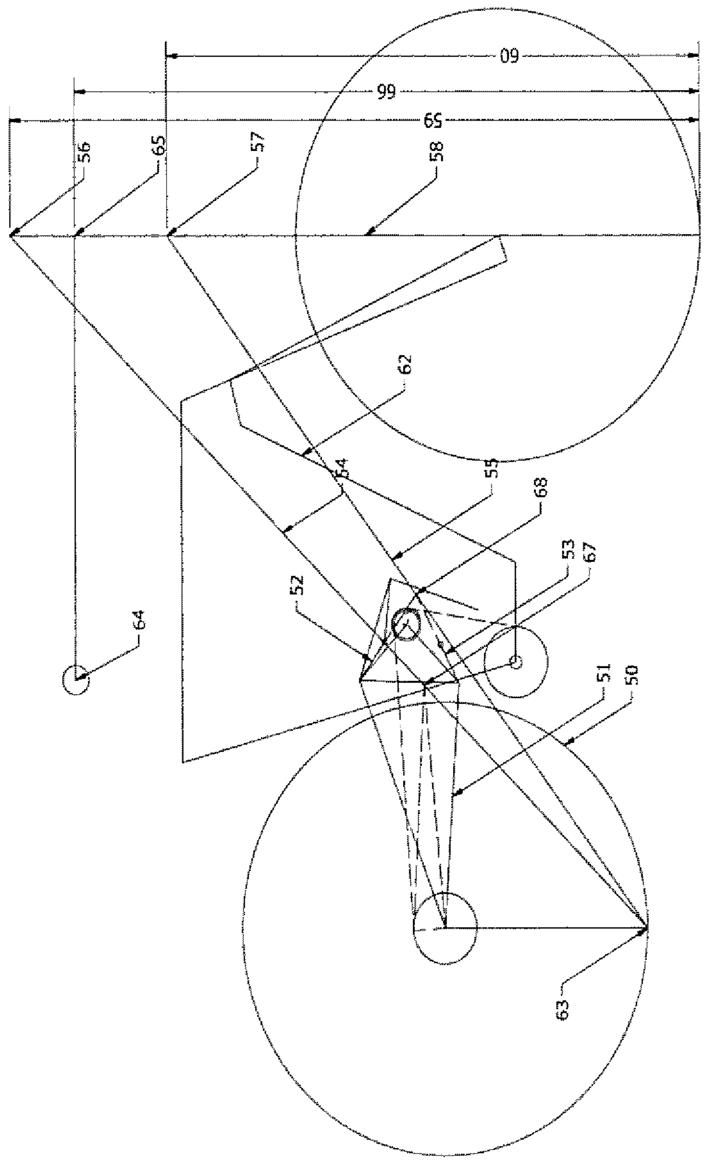
FIG. 24 is a side view of a bicycle with rear suspension illustrating anti-squat at 100 mm compression for a 30 (frame chassis drive chain ring)/12 (drive side jackshaft sprocket)/14 (non-drive side jackshaft sprocket)/30 (rear wheel drive sprocket) sprocket configuration.

FIG. 24 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 100% suspension compression and a 30 (frame chassis drive chain ring)/12 (drive side jackshaft sprocket)/14 (non-drive side jackshaft sprocket)/30 (rear wheel drive sprocket) sprocket configuration.

Figure 25:
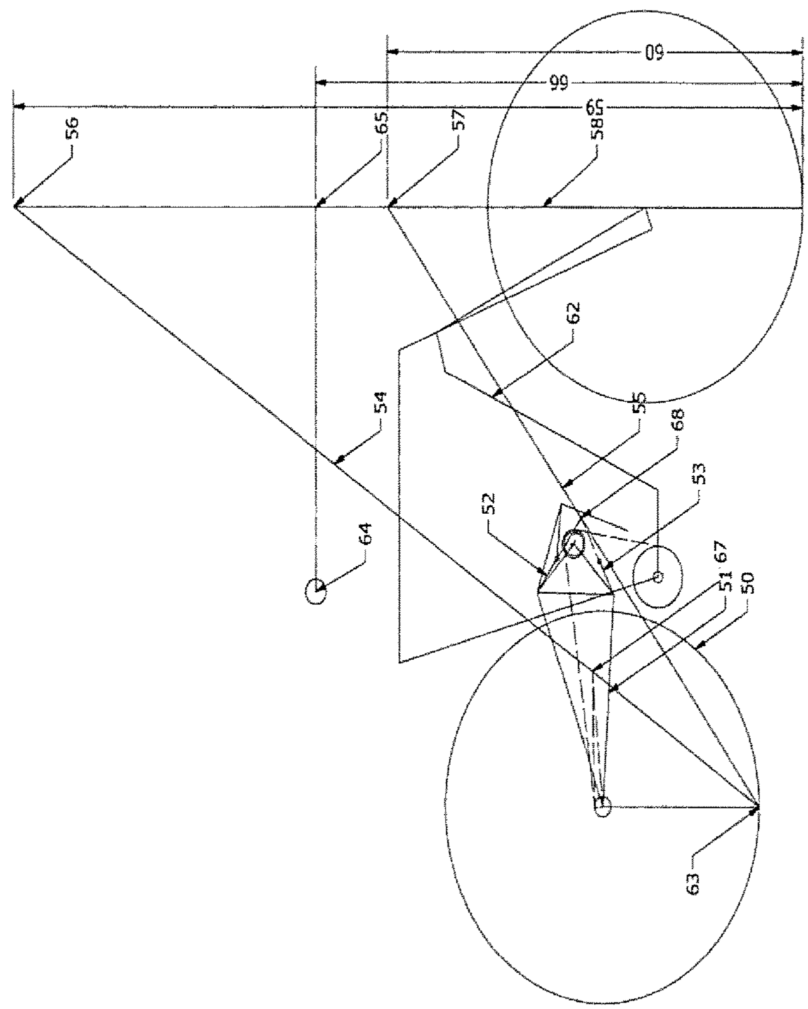
FIG. 25 is a side view of a bicycle with rear suspension illustrating anti-squat at 100 mm compression for a 30 (frame chassis drive chain ring)/12 (drive side jackshaft sprocket)/14 (non-drive side jackshaft sprocket)/10 (rear wheel drive sprocket) sprocket configuration.

FIG. 25 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 100% suspension compression and a 30 (frame chassis drive chain ring)/12 (drive side jackshaft sprocket)/14 (non-drive side jackshaft sprocket)/10 (rear wheel drive sprocket) sprocket configuration.

Figure 26:
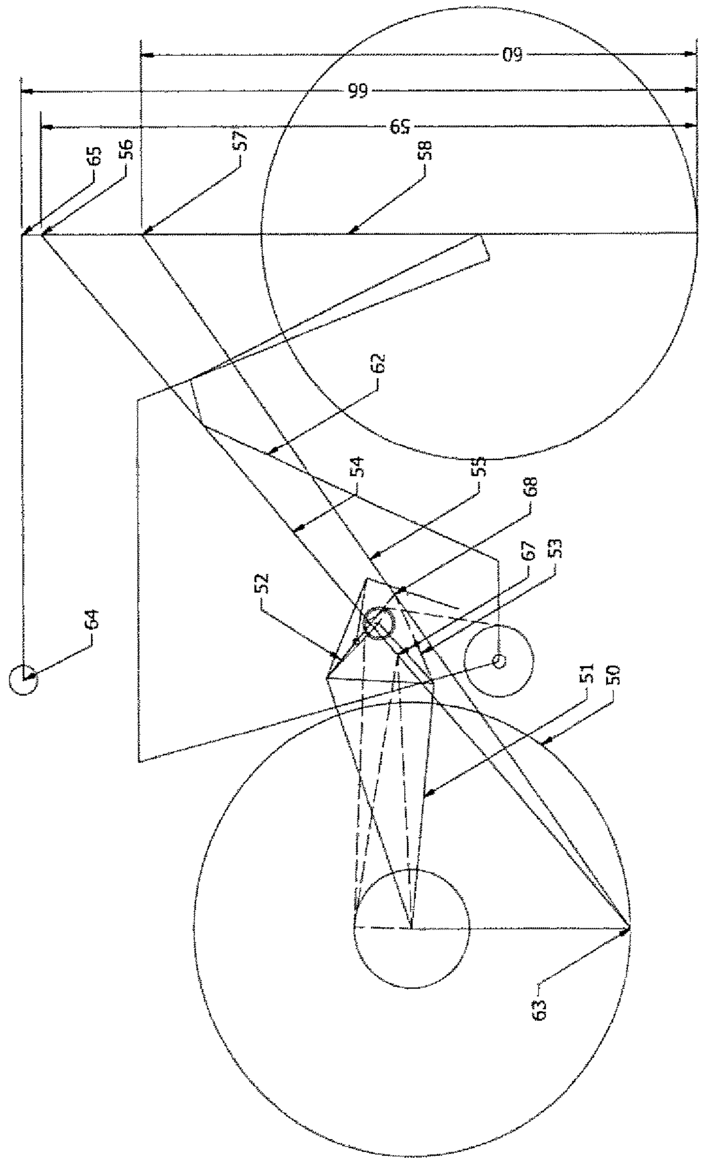
FIG. 26 is a side view of a bicycle with rear suspension illustrating anti-squat at 120 mm compression for a 30 (frame chassis drive chain ring)/12 (drive side jackshaft sprocket)/14 (non-drive side jackshaft sprocket)/50 (rear wheel drive sprocket) sprocket configuration.

FIG. 26 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 120% suspension compression and a 30 (frame chassis drive chain ring)/12 (drive side jackshaft sprocket)/14 (non-drive side jackshaft sprocket)/50 (rear wheel drive sprocket) sprocket configuration.

Figure 27:
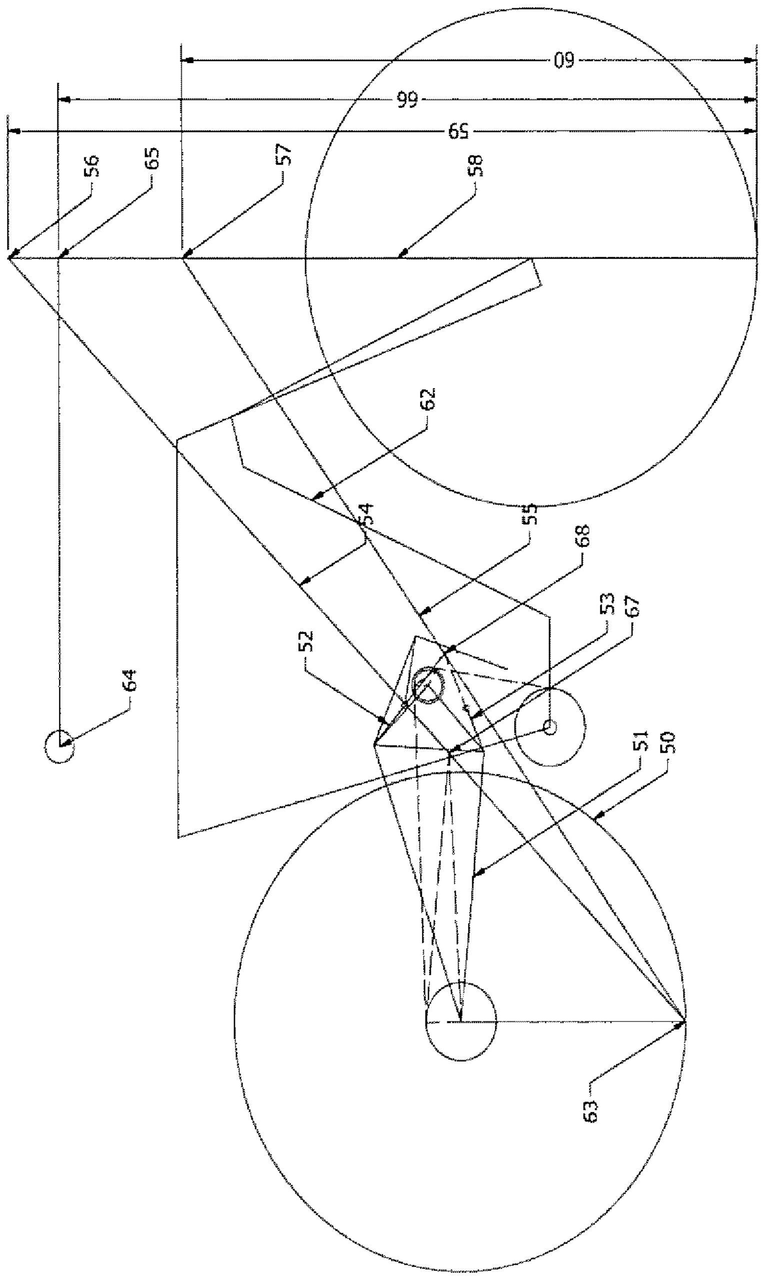
FIG. 27 is a side view of a bicycle with rear suspension illustrating anti-squat at 120 mm compression for a 30 (frame chassis drive chain ring)/12 (drive side jackshaft sprocket)/14 (non-drive side jackshaft sprocket)/30 (rear wheel drive sprocket) sprocket configuration.

FIG. 27 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 120% suspension compression and a 30 (frame chassis drive chain ring)/12 (drive side jackshaft sprocket)/14 (non-drive side jackshaft sprocket)/30 (rear wheel drive sprocket) sprocket configuration.

Figure 28:
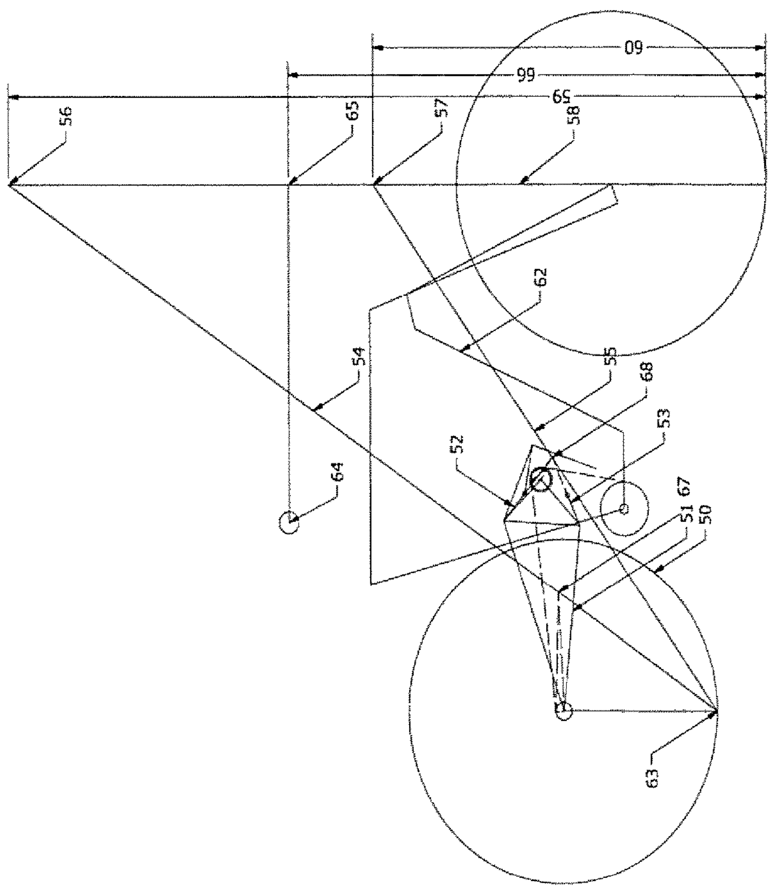
FIG. 28 is a side view of a bicycle with rear suspension illustrating anti-squat at 120 mm compression for a 30 (frame chassis drive chain ring)/12 (drive side jackshaft sprocket)/14 (non-drive side jackshaft sprocket)/10 (rear wheel drive sprocket) sprocket configuration.

FIG. 28 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 120% suspension compression and a 30 (frame chassis drive chain ring)/12 (drive side jackshaft sprocket)/14 (non-drive side jackshaft sprocket)/10 (rear wheel drive sprocket) sprocket configuration.

Figure 29:
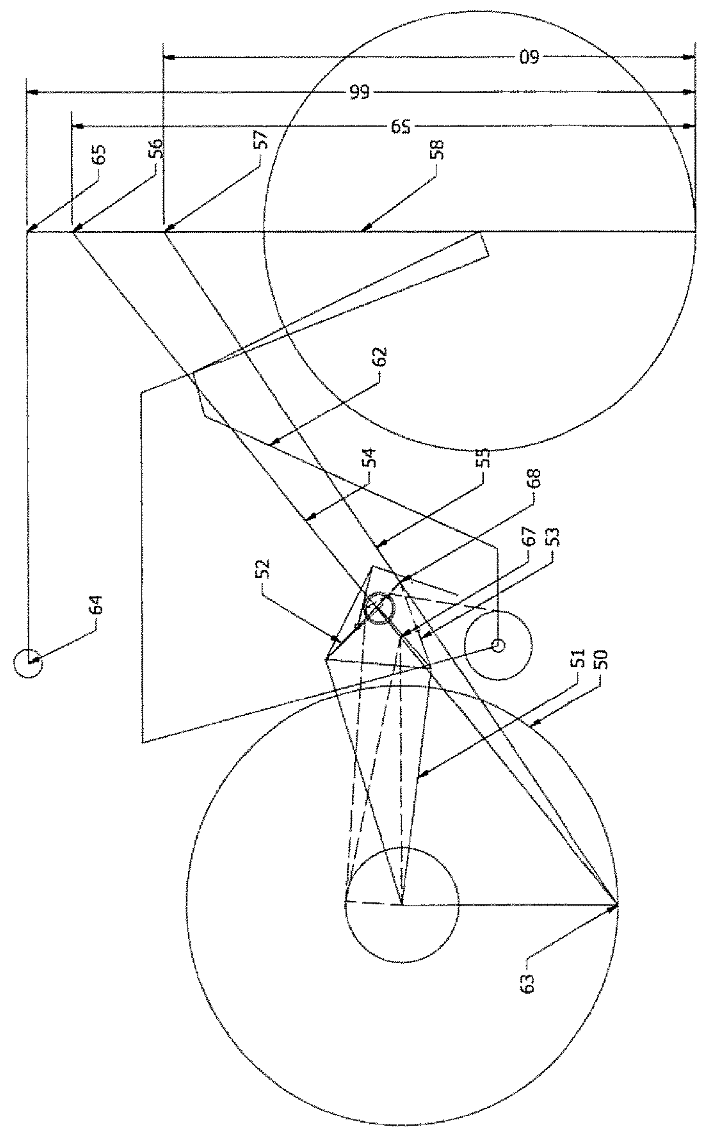
FIG. 29 is a side view of a bicycle with rear suspension illustrating anti-squat at 140 mm compression for a 30 (frame chassis drive chain ring)/12 (drive side jackshaft sprocket)/14 (non-drive side jackshaft sprocket)/50 (rear wheel drive sprocket) sprocket configuration.

FIG. 29 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 140% suspension compression and a 30 (frame chassis drive chain ring)/12 (drive side jackshaft sprocket)/14 (non-drive side jackshaft sprocket)/50 (rear wheel drive sprocket) sprocket configuration.

Figure 30:
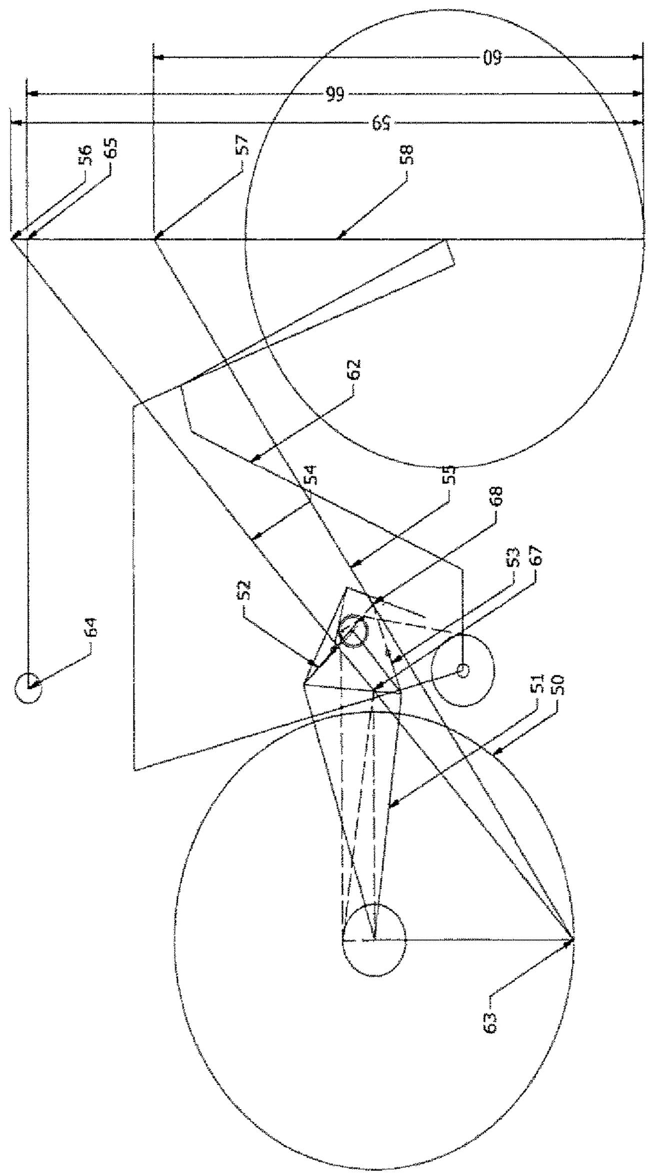
FIG. 30 is a side view of a bicycle with rear suspension illustrating anti-squat at 140 mm compression for a 30 (frame chassis drive chain ring)/12 (drive side jackshaft sprocket)/14 (non-drive side jackshaft sprocket)/30 (rear wheel drive sprocket) sprocket configuration.

FIG. 30 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 140% suspension compression and a 30 (frame chassis drive chain ring)/12 (drive side jackshaft sprocket)/14 (non-drive side jackshaft sprocket)/30 (rear wheel drive sprocket) sprocket configuration.

Figure 31:
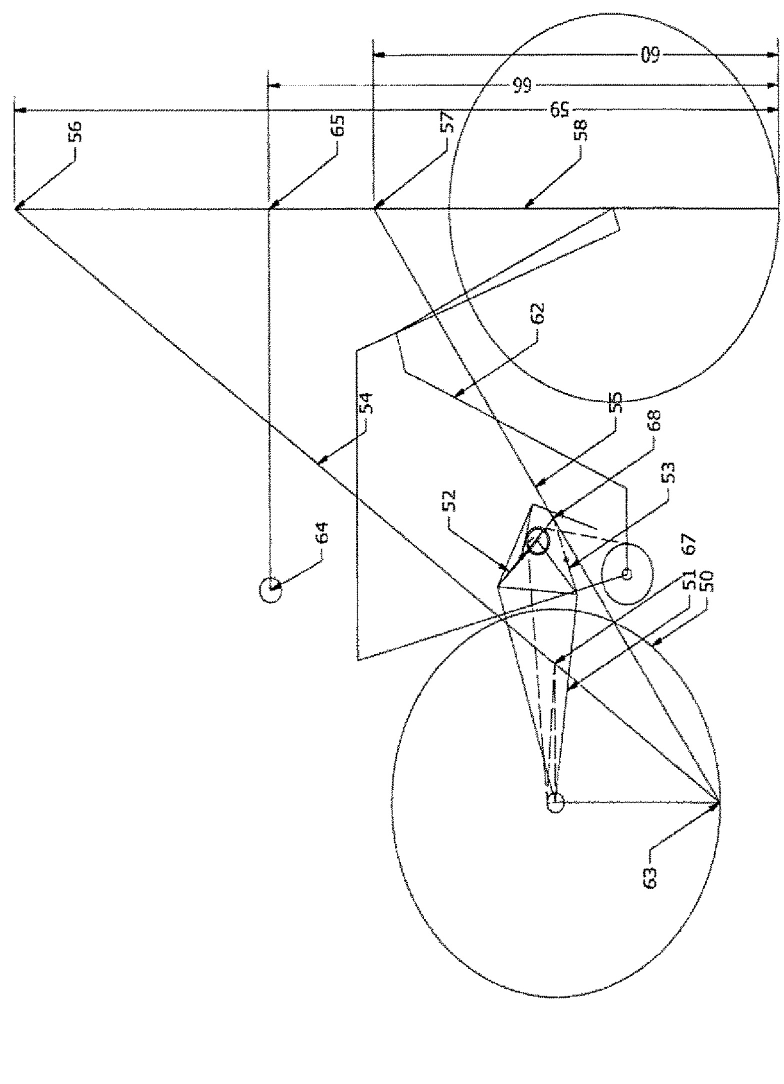
FIG. 31 is a side view of a bicycle with rear suspension illustrating anti-squat at 140 mm compression for a 30 (frame chassis drive chain ring)/12 (drive side jackshaft sprocket)/14 (non-drive side jackshaft sprocket)/10 (rear wheel drive sprocket) sprocket configuration.

FIG. 31 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 140% suspension compression and a 30 (frame chassis drive chain ring)/12 (drive side jackshaft sprocket)/14 (non-drive side jackshaft sprocket)/10 (rear wheel drive sprocket) sprocket configuration.

Figure 32:
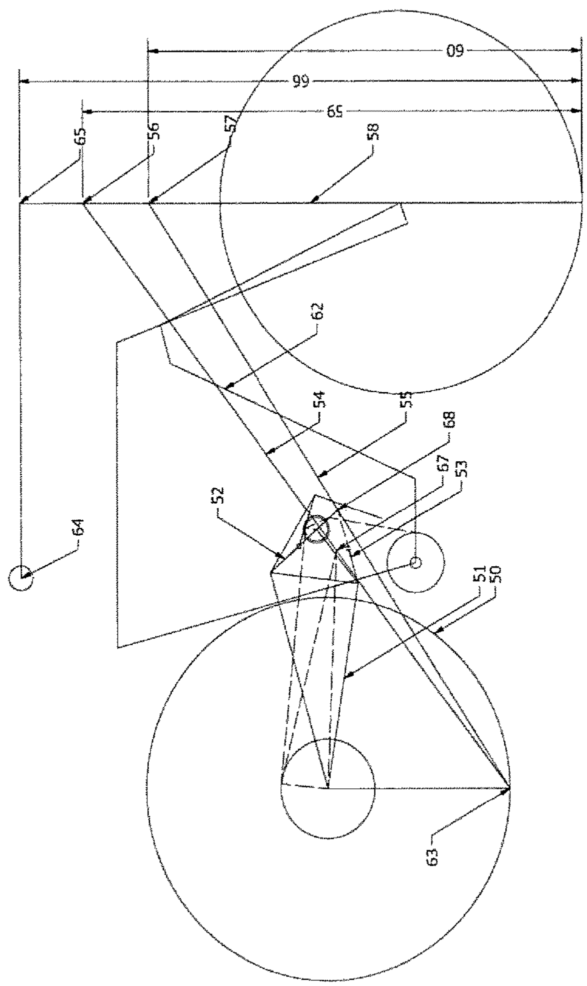
FIG. 32 is a side view of a bicycle with rear suspension illustrating anti-squat at 160 mm compression for a 30 (frame chassis drive chain ring)/12 (drive side jackshaft sprocket)/14 (non-drive side jackshaft sprocket)/50 (rear wheel drive sprocket) sprocket configuration.

FIG. 32 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 160% suspension compression and a 30 (frame chassis drive chain ring)/12 (drive side jackshaft sprocket)/14 (non-drive side jackshaft sprocket)/50 (rear wheel drive sprocket) sprocket configuration.

Figure 33:
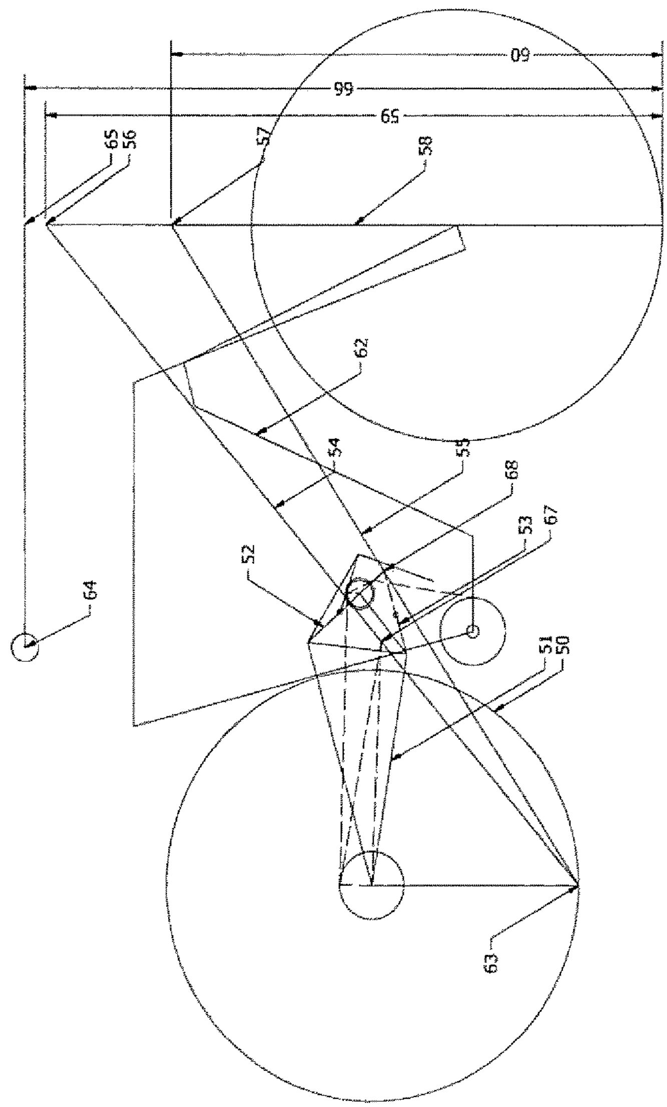
FIG. 33 is a side view of a bicycle with rear suspension illustrating anti-squat at 160 mm compression for a 30 (frame chassis drive chain ring)/12 (drive side jackshaft sprocket)/14 (non-drive side jackshaft sprocket)/30 (rear wheel drive sprocket) sprocket configuration.

FIG. 33 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 160% suspension compression and a 30 (frame chassis drive chain ring)/12 (drive side jackshaft sprocket)/14 (non-drive side jackshaft sprocket)/30 (rear wheel drive sprocket) sprocket configuration.

Figure 34:
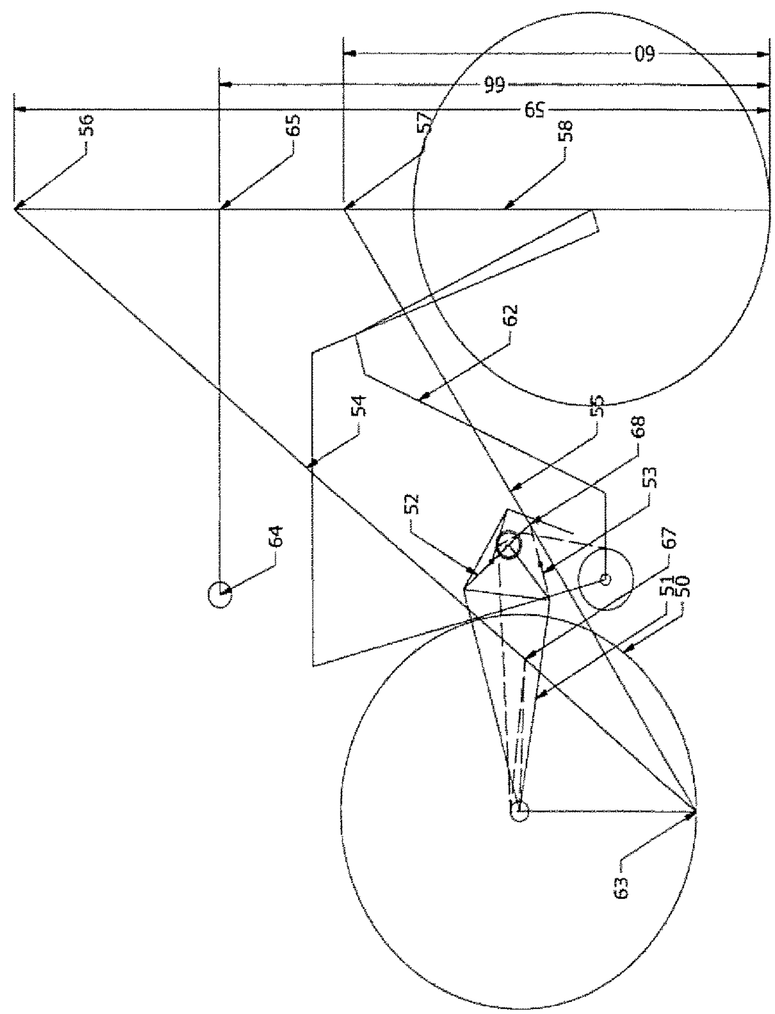
FIG. 34 is a side view of a bicycle with rear suspension illustrating anti-squat at 160 mm compression for a 30 (frame chassis drive chain ring)/12 (drive side jackshaft sprocket)/14 (non-drive side jackshaft sprocket)/10 (rear wheel drive sprocket) sprocket configuration.

FIG. 34 shows a particular embodiment of the present invention showing; a driven wheel (50), a swinging wheel carrier link (51), a upper carrier manipulation link (52), a lower carrier manipulation link (53), a squat force vector (54), a rise force vector (55), a squat definition point (56), a rise definition point (57), a squat/rise layout line (58), a measured squat distance (59), a measured rise distance (60), a driven wheel suspension travel distance (61), a vehicle chassis (62), a centre of the driven wheel tire to ground contact patch (63), a centre of gravity (64), a horizontal centre of gravity intersect with the squat layout line (65), a measured centre of gravity distance (66), a squat instant centre (67), a rise instant centre (68), at 160% suspension compression and a 30 (frame chassis drive chain ring)/12 (drive side jackshaft sprocket)/14 (non-drive side jackshaft sprocket)/10 (rear wheel drive sprocket) sprocket configuration.

A graphical representation of % anti-squat versus % of rear suspension travel for a particular suspension design is referred to as the acceleration response. The acceleration response varies according to the size of the various chainrings, jackshaft sprockets and rear wheel drive sprocket being used and the relative position of the wheel carrier in relation to suspension compression.

Figure 35:
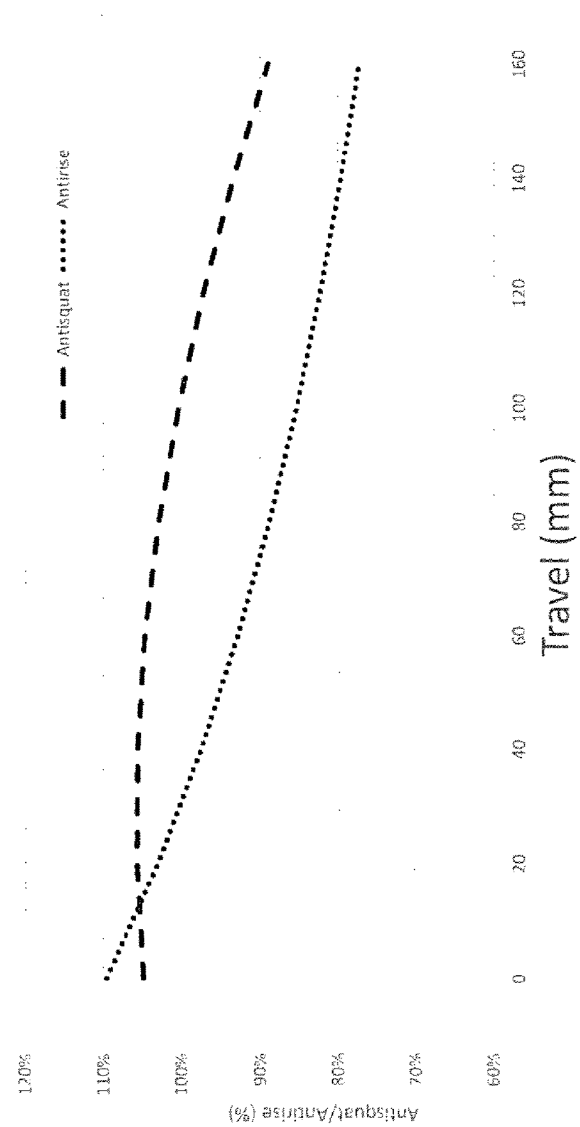
FIG. 35 is a graph illustrating acceleration response and deceleration response of a bicycle with rear suspension according to one embodiment.

FIG. 35 shows the acceleration response for a 30 (frame chassis drive chain ring)/12 (drive side jackshaft sprocket)/14 (non-drive side jackshaft sprocket)/10 (rear wheel drive sprocket) sprocket configuration.

Figure 36:
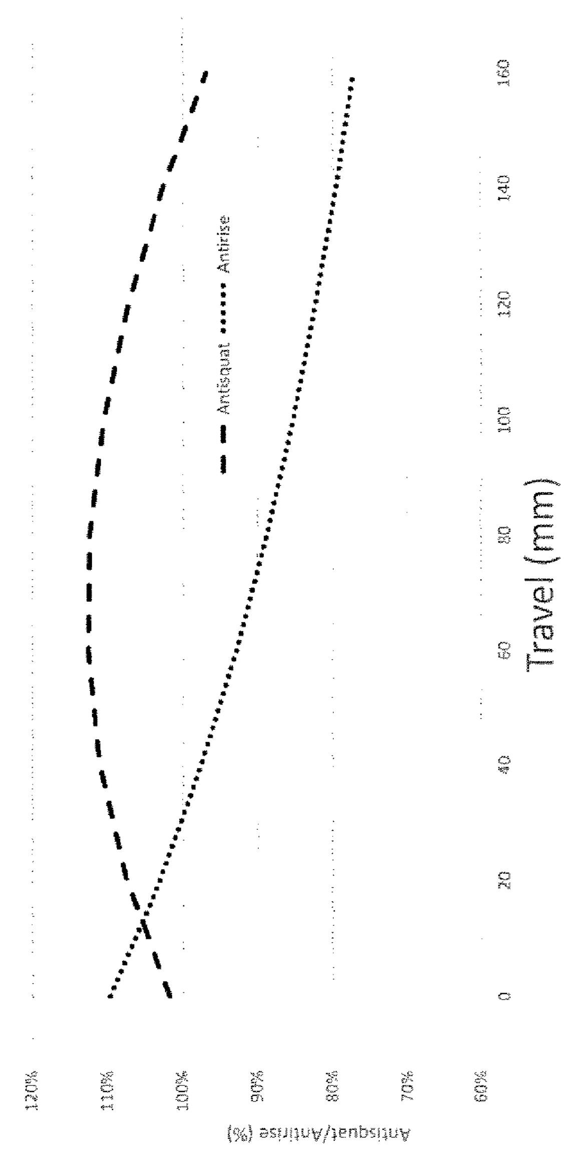
FIG. 36 is a graph illustrating acceleration response and deceleration response of a bicycle with rear suspension according to a second embodiment.

FIG. 36 show the acceleration response for a 30 (frame chassis drive chain ring)/12 (drive side jackshaft sprocket)/14 (non-drive side jackshaft sprocket)/10 (rear wheel drive sprocket) sprocket configuration.

Figure 37:
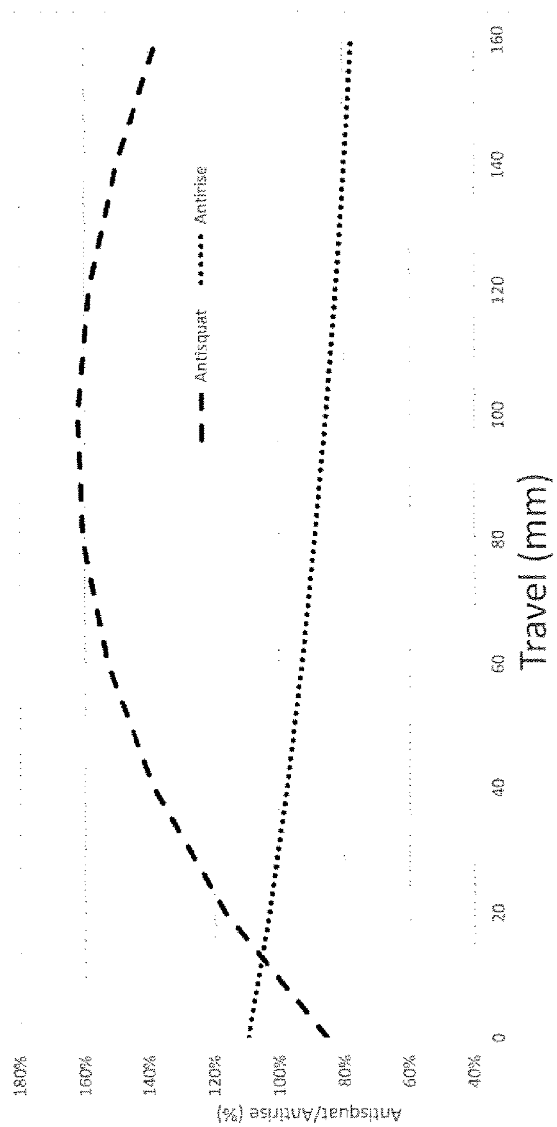
FIG. 37 is a graph illustrating acceleration response and deceleration response of a bicycle with rear suspension according to a third embodiment.

FIG. 37 show the acceleration response for a 30 (frame chassis drive chain ring)/12 (drive side jackshaft sprocket)/14 (non-drive side jackshaft sprocket)/10 (rear wheel drive sprocket) sprocket configuration.

For conventional drivetrain designs where chain lengthening is utilized to manage anti-squat requirements, the desired amount of anti-squat is determined by the designer. If the anti-squat calculation equates to 100% the suspension system will neither compress nor extend under acceleration. Typically for a conventional drivetrain design, utilising a short link four bar design, the instant centre is located in front of and above the front crankset, and the instant centre path moves downward and forward from the initial starting point. This tends to produce an acceleration response which is typically above 100% from 0 to 50% suspension compression. This tends to be the range within which pedalling occurs. Beyond 50% suspension compression the acceleration response tends to reduce quite rapidly. As there is likely to be little pedalling taking place in this range there is not the same requirements for anti-squat. The reduced acceleration response reduces the chain growth that occurs also and hence the counter rotation at the crankset that would take place as a result. As the rear suspension system compresses the rear shock spring force increases. As the spring force increases squat forces have less of a manipulating effect on the rear suspension system. For these reasons it is normal for the designer to reduce the amount of anti-squat as the suspension system is compressed.

In an embodiment of the present invention the anti-squat response has an acceleration response that has the following characteristics:

For a 30 (frame chassis drive chain ring)/12 (drive side jackshaft sprocket)/14 (non-drive side jackshaft sprocket)/50 (rear wheel drive sprocket) sprocket configuration the antisquat values vary from a maximum of 106% to a minimum of 89% antisquat at full compression.

For a 30 (frame chassis drive chain ring)/12 (drive side jackshaft sprocket)/14 (non-drive side jackshaft sprocket)/30 (rear wheel drive sprocket) sprocket configuration the antisquat values vary from a maximum of 107% to a minimum of 97% antisquat at full compression.

For a 30 (frame chassis drive chain ring)/12 (drive side jackshaft sprocket)/14 (non-drive side jackshaft sprocket)/10 (rear wheel drive sprocket) sprocket configuration the antisquat values vary from a maximum of 162% to a minimum of 85% antisquat at 0% compression.

A graphical representation of % anti-rise versus % of rear suspension travel for a particular suspension design is referred to as the deceleration response.

FIG. 35 shows the deceleration response for a 30 (frame chassis drive chain ring)/12 (drive side jackshaft sprocket)/14 (non-drive side jackshaft sprocket)/10 (rear wheel drive sprocket) sprocket configuration.

FIG. 36 show the deceleration response for a 30 (frame chassis drive chain ring)/12 (drive side jackshaft sprocket)/14 (non-drive side jackshaft sprocket)/10 (rear wheel drive sprocket) sprocket configuration.

FIG. 37 show the deceleration response for a 30 (frame chassis drive chain ring)/12 (drive side jackshaft sprocket)/14 (non-drive side jackshaft sprocket)/10 (rear wheel drive sprocket) sprocket configuration.

In an embodiment of the present invention the anti-squat response has an acceleration response that has the following characteristics:

For a 30 (frame chassis drive chain ring)/12 (drive side jackshaft sprocket)/14 (non-drive side jackshaft sprocket)/50 (rear wheel drive sprocket) sprocket configuration the antisquat values vary from a maximum of 110% to a minimum of 77% antisquat at full compression.

For a 30 (frame chassis drive chain ring)/12 (drive side jackshaft sprocket)/14 (non-drive side jackshaft sprocket)/30 (rear wheel drive sprocket) sprocket configuration the antisquat values vary from a maximum of 110% to a minimum of 77% antisquat at full compression.

For a 30 (frame chassis drive chain ring)/12 (drive side jackshaft sprocket)/14 (non-drive side jackshaft sprocket)/10 (rear wheel drive sprocket) sprocket configuration the antisquat values vary from a maximum of 110% to a minimum of 77% antisquat at full compression.

Figure 38:
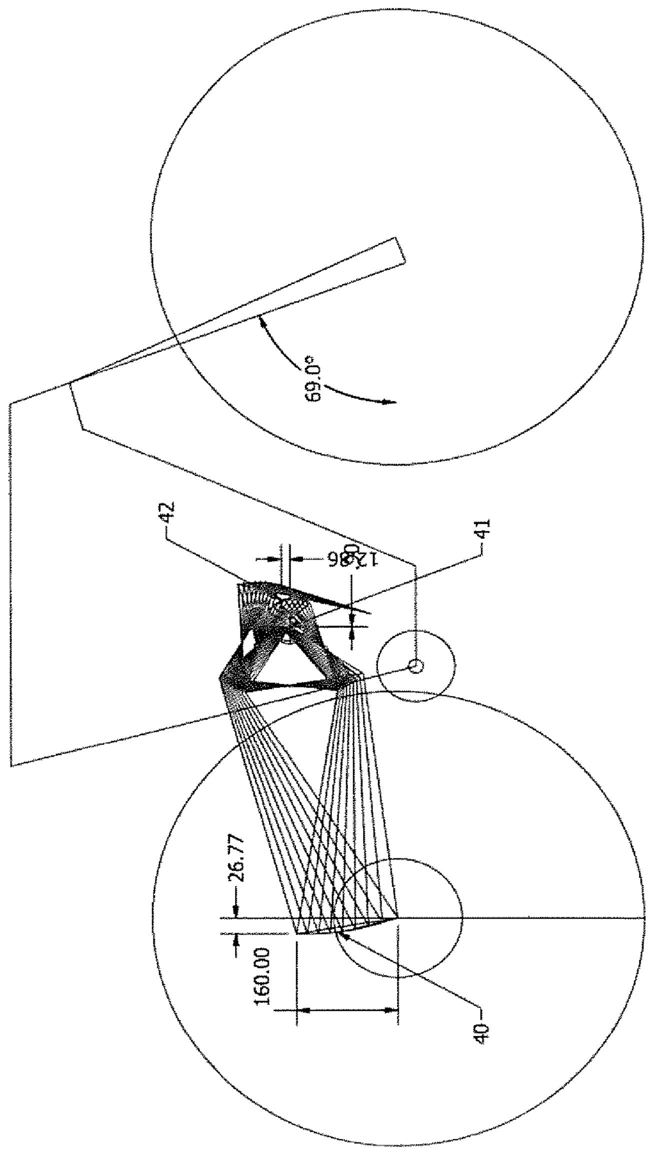
FIG. 38 is a side view of bicycle with rear suspension illustrating the rear wheel path, jackshaft path and the instant centre path.

FIG. 38 presents graphically the rear wheel axle path (40), the instant centre path (41), and the jack shaft sprocket centre (42).

Figure 39:
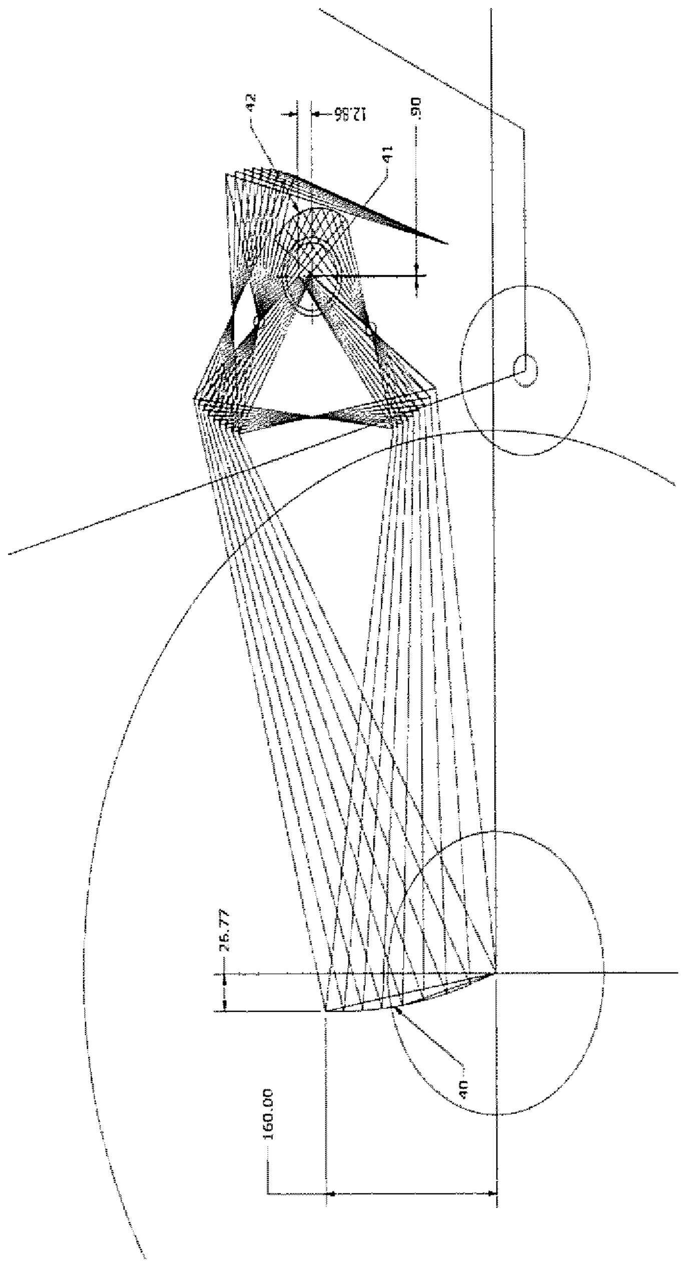
FIG. 39 is a side view illustrating the detailed rear wheel path, jackshaft path and the instant centre path.

FIG. 39 shows a detailed view of the instant centre path (41) and the jack shaft sprocket centre (42).

For a conventional drive train when the rear suspension system is compressed the rear wheel path normally rotates upward and generally forward from the starting position in and arc. The direction and curvature of this arc is referred to as the wheel path and is dependent on the placement of the pivot position and whether it is a single pivot or utilises multiple linkages and an instant centre. The reason for this type of axle path is to ensure that chain growth is kept to a minimum. As the rear wheel axle moves upward the distance between the centre of the bottom bracket and the centre of the rear wheel increases. When the crankset is being rotated by pedal pressure the only way of extending the chain length is for the front crankset to rotate anticlockwise which gives rise to crankset counter rotation.

The rotation of the rear wheel axle in an arc around a single pivot of virtual pivot of some description also has the effect of shortening the wheel base between the bottom bracket and the rear axle centre. As the front wheel suspension system compresses the front hub to bottom bracket distance reduces also. This combined rear wheel and front wheel base shortening results in the overall wheelbase length decreasing significantly as a result. This is undesirable in terms of the handling characteristics of the bike. A more rearward rear wheel path would allow the suspension system to respond better to sharp edged terrain variations much more efficiently. The rearward rear wheel path however would result in significant chainstay and chain lengthening and result in considerable crankset counter rotation. By way of example a conventional multi-link frame configuration typically has a wheelbase reduction of the order of 68 mm and chain stay lengthening of 18.4 mm.

In comparison an embodiment of the present invention has a rear wheel path normally that rotates upward and generally rearward from the starting position in an arc when the rear suspension is compressed. As a result the overall wheelbase shortening that occurs is only 42.4 mm. This is advantageous from a handling perspective.

By comparison the chain stay lengthens by 63.7 mm. This represents and increase of around 3.5 times the increase associated with a conventional drive train system. This is as a result of a rear wheel path that is upward and rearward during suspension compression. This wheel path is also advantageous from a handling perspective in that it provides better capacity for the rear wheel to roll over square edged bumps on the trail surface. The rear wheel being able to move upward and rearward is more efficient than a wheel path that only allows the wheel to move vertically.

Conventional frame–chain stay increase=18.4 mm
Conventional frame–wheelbase decrease=68 mm
Present invention frame–chain stay increase=63.7 mm
Present invention frame–wheelbase decrease=42.4 mm In an embodiment of the present invention there is chainstay lengthening between the centre of the bottom bracket and the rear wheel centre. There is however no chain lengthening for the chainset connecting the jackshaft sprocket to the rear wheel drive sprocket. There is a small amount of lengthening in the chainset that connects the chainring sprocket to the jackshaft sprocket. The magnitude of this lengthening is approximately 12.9 mm. There is therefore a 30% reduction in crankset counter rotation when compared to a conventional multi-link frame configuration.

In an embodiment of the present invention the instant centre path starts at a point above and forward of the centre of the jackshaft sprocket and moves downward in an arc around the jackshaft sprocket. This projected instant centre being forward of the jackshaft sprocket provides for the required anti-squat needed to counteract pedalling induced accelerations and the impact that would otherwise have on the rear suspension system. Pedalling forces apply a downward force on the rear swingarm via the chainset connecting the front chainring sprocket to the jackshaft sprocket.

In use the chain between the crankset and jackshaft sprocket directs a force on the swingarm and this force is directed just rearward of the instant centre. The chain force therefore tries to rotate the swingarm counter clockwise. This force counteracts the tendency for acceleration to try to compress the rear swinger.

In an alternative embodiment of the invention (not shown) instead of a jackshaft with two sprockets at the front of the swingarm there is a swingarm mounted idler with one sprocket. In this embodiment there is only one chainset and this runs from the front crankset (on the right hand side of the frame) to the idler sprocket and then to the rear cluster. This embodiment produces the same result as the previously described embodiment.

The present invention has a number of advantages over known rear suspension systems. In use as the rear wheel can be directed upward and rearward and this improves the way the rear suspension can handle bumps without creating significant chain lengthening and crankset counter rotation. The anti-squat response (% anti-squat versus rear wheel travel) is far more consistent and operates within a much smaller range than does a conventional bike. The anti-squat response does not vary significantly between various gear combinations. The wheelbase length (distance between the front and rear wheel) reduction is less than for a conventional frame. This is advantageous from a handling perspective. Also a user can provide for different gear ratios by using different sized jackshaft sprockets. Furthermore, the braking response is very good. Additionally from a geometry perspective the design allows for relatively short chainstays, longer travel for 29er bikes with larger wheels in that the rear wheel travels rearward and upward and the rear wheel is not as likely to contact the frame or seat as with other designs. The design also allows for a very low top tube which helps with standover clearance.

While the present invention has been described in terms of specific embodiments, it should be appreciated that the spirit and scope of the invention is not limited to those embodiments. Furthermore, the above disclosure uses relative terms for position and orientation. For example, front, rear, top, bottom, up, down, clockwise, counter-clockwise, drive side, non-drive side and the like are used to describe the illustrated bicycle frame. It should be understood that these terms are used in relation to how the bicycle frame is drawn in the figures, and that other terms may be appropriate when looking at the bicycle frame from a different perspective.

Furthermore, it is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the bicycle frame, the swingarm, the links, the jackshaft, jackshaft sprockets, jackshaft idler may vary dependent on the particular application for which it is used without variation in the spirit and scope of the present invention.

In addition, although the preferred embodiments described herein are directed to a rear suspension, it will be appreciated by those skilled in the art that variations and modifications are possible within the scope of the appended claims.

Key to numbered parts and/or elements of the invention:

| | |
|---|---|
| 1 | Frame chassis |
| 2 | Head tube |
| 3 | Seat tube |
| 4 | Top tube |
| 5 | Down tube |
| 6 | Bottom bracket |
| 7 | Derailleur hanger |
| 8 | Fork |
| 9 | Front wheel |
| 10 | Rear wheel |
| 11 | Seat post |
| 12 | Stem |
| 13 | Seat |
| 14 | Handlebar |
| 15 | Upper carrier manipulation link upper shock pivot |
| 16 | Lower frame shock pivot |
| 17 | Rear shock |
| 18 | Rear rotatable wheel carrier |
| 19 | Rear rotatable wheel carrier seat stay |
| 20 | Rear rotatable wheel carrier seat stay |
| 21 | Drive side crankset |
| 22 | Non-drive side crank |
| 23 | Rear wheel centre |
| 24 | Bottom bracket centre |
| 25 | Rear wheel insertion slot |
| 26 | Upper carrier manipulation link |
| 27 | Lower carrier manipulation link |
| 28 | Upper carrier manipulation link rear pivot |
| 29 | Upper carrier manipulation link forward pivot |
| 30 | Lower carrier manipulation link rear pivot |
| 31 | Lower carrier manipulation link forward pivot |
| 32 | Frame chassis drive chain ring |
| 33 | Drive side jackshaft sprocket |
| 34 | Non-drive side jackshaft sprocket |
| 35 | Rear wheel drive sprocket |
| 36 | Chain set connecting the non-drive side jackshaft sprocket to the rear wheel drive sprocket |
| 37 | Chain set connecting the drive side jackshaft sprocket to the frame chassis chain ring |
| 38 | Non-drive side chain return pulley |
| 39 | Bottom bracket centre to rear wheel centre distance |
| 40 | Rear wheel axle path |
| 41 | Instant centre path |
| 42 | Jackshaft sprocket centre path |
| 50 | A driven wheel |
| 51 | A swinging wheel carrier link |
| 52 | A upper carrier manipulation link |
| 53 | A lower carrier manipulation link |
| 54 | A squat force vector |
| 55 | A rise force vector |
| 56 | A squat definition point |
| 57 | A rise definition point |
| 58 | A squat/rise layout line |
| 59 | A measured squat distance |
| 60 | A measured rise distance |
| 61 | A driven wheel suspension travel distance |
| 62 | A vehicle chassis |
| 63 | A centre of the driven wheel tire ground contact patch |
| 64 | A centre of gravity |
| 65 | A horizontal centre of gravity intersect with the squat layout line |
| 66 | A measured centre of gravity distance |
| 67 | A squat instant centre |
| 68 | A rise instant centre |

-continued

| Line | Line | Intersect Name |
|---|---|---|
| AB | CD | E |
| FG | IE | H |
| IJ | KL | M |
| JH | ME | N |
| LN | KE | O |

The invention claimed is:

1. A rear suspension for a bicycle comprising:

a swingarm having a front end and a rear end and wherein the rear end is configured to attach to a rear wheel of the bicycle;

an upper link and a lower link both adapted to pivotally connect the swingarm to a frame of the bicycle; and a jackshaft having a drive side sprocket and a non drive side sprocket and being connected to the front end of the swingarm;

the rear suspension configured such that when in use with the bicycle, a chain connects a drive side front crankset to the drive side sprocket and a second chain connects the non drive side sprocket to a rear wheel sprocket and wherein the arrangement allows the rear wheel of the bicycle to move rearward and upward in use.

2. A rear suspension according to claim 1, wherein the upper link is an upper carrier manipulation link having a forward pivot that is connected to the frame and a rear pivot that is connected to the swingarm and the lower link is a lower carrier manipulation link having a forward pivot that is connected to the frame and a rear pivot that is connected to the swingarm.

3. A rear suspension according to claim 1, wherein the upper link is an upper carrier manipulation link having a forward pivot that is connected to the frame and a rear pivot that is connected to the swingarm and the lower link is a lower carrier manipulation link having a forward pivot that is connected to the frame and rear pivot that is connected to the swinger and wherein a line intersecting the forward pivot and the rear pivot of the upper carrier manipulation link and a line intersecting the forward pivot and the rear pivot of the lower carrier manipulation link both intersect at an instant center and wherein the instant center is forward of a center of rotation of the jackshaft and remains ahead of the center of rotation of the jackshaft as the rear suspension compresses and decompresses.

4. A rear suspension according to claim 1, wherein the upper link is an upper carrier manipulation link having, a forward pivot that is connected to the frame and a rear pivot that is connected to the swingarm and the lower link is a lower carrier manipulation link having a forward pivot that is connected to the frame and a rear pivot that is connected to the swingarm and wherein in use compression of the rear suspension rotates both the upper carrier manipulation link and the lower carrier manipulation link clockwise.

5. A rear suspension according to claim 1, wherein the upper link is an upper carrier manipulation link having a forward pivot that is connected to the frame and a rear pivot that is connected to the swingarm and the lower link is a lower carrier manipulation link having, a forward pivot that is connected to the frame and a rear pivot that is connected to the swingarm and wherein the upper carrier manipulation link is pivotally connected to an upper end of a rear shock and a lower end of the rear shock is pivotally connected to the frame of the bicycle when in use.

6. A rear suspension according to claim 1, wherein in use with the bicycle a rear wheel path moves rearward and upward.

* * * * *